United States Patent [19]
Eglit

[11] Patent Number: 5,739,867
[45] Date of Patent: Apr. 14, 1998

[54] METHOD AND APPARATUS FOR UPSCALING AN IMAGE IN BOTH HORIZONTAL AND VERTICAL DIRECTIONS

[75] Inventor: Alexander J. Eglit, Half Moon Bay, Calif.

[73] Assignee: Paradise Electronics, Inc., San Jose, Calif.

[21] Appl. No.: 804,623

[22] Filed: Feb. 24, 1997

[51] Int. Cl.⁶ .................................................. H04N 7/01
[52] U.S. Cl. .......................... 348/581; 348/441; 345/127; 345/131
[58] Field of Search ............................... 348/441, 581, 348/578, 448, 458; 345/127, 131

[56] References Cited

U.S. PATENT DOCUMENTS

| | | | |
|---|---|---|---|
| 4,532,602 | 7/1985 | DuVall | 364/577 |
| 4,546,349 | 10/1985 | Prohofsky et al. | 340/731 |
| 4,589,029 | 5/1986 | Torimaru et al. | 358/224 |
| 4,604,651 | 8/1986 | Frencken et al. | 358/140 |
| 4,746,981 | 5/1988 | Nadan et al. | 358/160 |
| 4,821,031 | 4/1989 | Roberts | 340/731 |
| 4,891,702 | 1/1990 | Nakayama et al. | 358/140 |
| 4,914,507 | 4/1990 | Smith et al. | 358/11 |
| 4,952,923 | 8/1990 | Tamura | 340/731 |
| 5,001,697 | 3/1991 | Torres | 364/521 |
| 5,122,789 | 6/1992 | Ito | 340/731 |
| 5,138,448 | 8/1992 | Gillies et al. | 358/140 |
| 5,170,256 | 12/1992 | Tabata | 358/230 |
| 5,243,433 | 9/1993 | Hailey | 358/214 |
| 5,253,064 | 10/1993 | Yamamoto et al. | 358/180 |
| 5,257,103 | 10/1993 | Vogeley et al. | 348/448 |
| 5,331,346 | 7/1994 | Shields et al. | 348/441 |
| 5,406,308 | 4/1995 | Shiki | 345/127 |
| 5,410,357 | 4/1995 | Rieger et al. | 348/458 |
| 5,444,495 | 8/1995 | Takahama et al. | 348/458 |
| 5,459,520 | 10/1995 | Sasaki | 348/445 |
| 5,459,521 | 10/1995 | Usami | 348/445 |
| 5,469,223 | 11/1995 | Kimura | 348/581 |
| 5,473,381 | 12/1995 | Lee | 348/441 |
| 5,528,305 | 6/1996 | Kim | 348/446 |
| 5,534,934 | 7/1996 | Katsumata | 348/445 |
| 5,534,936 | 7/1996 | Kim | 348/458 |
| 5,555,027 | 9/1996 | Takeuchi | 348/581 |
| 5,600,347 | 2/1997 | Thompson et al. | 345/127 |
| 5,610,942 | 3/1997 | Chen et al. | 375/242 |
| 5,642,168 | 6/1997 | Masaki | 348/458 |

FOREIGN PATENT DOCUMENTS

| | | |
|---|---|---|
| 64-241745 | 9/1989 | Japan . |
| 08-279947 | 10/1996 | Japan . |

*Primary Examiner*—Victor R. Kostak
*Attorney, Agent, or Firm*—Law Firm of Naren Thappeta

[57] ABSTRACT

An upscaler for upscaling a source image to generate a destination image without having to maintain the aspect ratio (ratio of the length of the source image to that of the width) of the source image. The source image pixel data is received at a first clock rate and the destination image is generated at a second clock rate. The second clock rate is computed such that the frame rate at which the source image is received is the same as the frame rate at which the upscaled image is generated. Because of such a clock rate, the upscaler may be implemented only a line buffer for upscaling a source image. Prior systems may require large memories such as frame buffers for achieving similar functionality.

75 Claims, 11 Drawing Sheets

METHOD AND APPARATUS FOR UPSCALING AN IMAGE IN BOTH HORIZONTAL AND VERTICAL DIRECTIONS

RELATED APPLICATIONS

The present application is related to co-pending application entitled, "A Method and Apparatus for Clock Recovery in a Digital Display Unit", Ser. No. UNASSIGNED, Attorney Docket Number PRDN-0002, filed concurrently herewith, and is incorporated in its entirety herewith.

BACKGROUND OF THE INVENTION

1. Field of the invention

The present invention relates to graphics systems, and more specifically to a method and apparatus for upscaling a source image to generate a destination image.

2. Related Art

Graphics systems often display images on display screens. For example, a computer system may display the image of an object on a flat-panel monitor. Television systems and cameras are some of the other examples of such graphics systems. To achieve the display of an image, the image is generally represented by image data (e.g., RGB data or YUV data), and display signals are generated from the image data. The display signals cause the image to be displayed on a corresponding display screen.

During such a display, a graphics system may need to upscale the image. The upscaling may be needed for one or more of several reasons. For example, a source image may be provided in one resolution (e.g., 160×120 size image data from a CD-ROM decoder), and the image may need to be displayed on a larger display screen (e.g., 640×480 CRT screen). To take advantage of the larger display area, a graphics system may upscale the image.

In addition, with the advancements in user interfaces, a user of a graphics system may wish to have the image resized without maintaining the aspect ratio of the source image. That is, the image may need to be upscaled by different factors with regards to the length and the width. Thus, a user may specify that the image be doubled in the length dimension while upscaling the breadth dimension by a factor of 1.5. A well-designed graphics system should be able to meet such different needs of a user.

Graphics systems typically include special circuitry to upscale images. Examples of such circuitry include well-known graphics controller chips typically housed on a mother board of a computer system and special chip sets provided with LCD panels of computer systems and video cameras.

While providing the upscaling functionality, the special circuitry may need to meet specific requirements of the environment of usage. For example, if the special circuitry is used in a flat monitor, the circuitry may need to be compact. Without such compactness, the circuitry may be unsuitable for flat monitor environments where it is critical that circuitry occupy minimal space. In addition, it may be desirable to keep to a minimal level the total amount of power consumed by the special circuitry, particularly in the portable applications market (e.g., laptop computers).

SUMMARY OF THE INVENTION

The present invention is directed to an upscaler which upscales a source image to generate a destination image. The source image is generally received as one or more successive frames. Each source frame or portion thereof can be upscaled in accordance with the present invention. Each source frame (or source image, in general) includes a plurality of source scan lines, with each scan line including a plurality of pixels (source image pixel data The source image pixel data is received at a first clock rate. The upscaled image pixel data is generated using a second clock rate. The second clock rate is computed such that the frame rate at which a source image is received is equal to the frame rate at which the upscaled image is generated. The other internal blocks of the upscaler may be designed to operate consistent with this requirement.

By choosing the two frame rates to be equal, an upscaler in accordance with the present invention can upscale a source image without having to maintain the aspect ratio (ratio of the length of an image to the width) of the image. That is, the destination image can have an aspect ratio which is different from that of the source image. Accordingly, a user has the flexibility to specify desired display lengths and widths without being constrained by the corresponding dimensions of the source image.

In addition, such a functionality is achieved by using only a line buffer in one embodiment of the present invention. Thus, a system in accordance with the present invention may not require large memories such as frame buffers to provide one or more advantages of the present invention. Frame buffers can consume high quantities of electrical power due to their large memory size, and can also be expensive. Thus, by using only a line buffer, the present invention may avoid high power consumption and excessive costs.

In accordance with the present invention, the clock period of the second clock signal is equal to a constant times the clock period of the first clock signal. The value of the constant depends on the horizontal and vertical upscaling factors. The constant value can be computed a priori based on the dimensions of the source image and the destination (or upscaled) image. Accordingly, the destination clock signal can be implemented to track the source clock signal.

An example embodiment of the upscaler of the present invention includes an input data synchronizer for receiving the source image pixel data using a first clock signal, and for providing the same pixel data using a second clock signal. Even though different clock signals are used when data is received by and transferred out of the synchronizer, the same amount of data is transferred in the two instances within a given period of time. As a result, the effective rate of data transfer is the same in the two instances.

The pixel data is received by a line buffer from the input data synchronizer using the second clock signal. The data is transferred out of the line buffer using the second clock signal. However, some of the source image pixel data is provided (transferred out) multiple times. Specifically, some of the source image scan lines are replicated and some of the pixel data within each scan line are also replicated. Accordingly, a line qualifier signal and a pixel qualifier signal are provided to indicate when the pixel processing is advanced to the next source scan line and the next source pixel data respectively. These qualifier signals are used by the other components of the present invention for a consistent operation.

The synchronizer and line buffer together are described as being included in a time base converter. The amount of data transferred out of the line buffer is more than the amount of data received by the line buffer. The data is transferred out using the second clock. Thus, the effective rate of data transfer out of the line buffer is different from that of the rate at which data is transferred into line buffer. Accordingly, the time base for the data flow is said to have been changed in the time base converter.

The source image pixel data from the time base converter is optionally provided to an interpolator. An image resulting from the interpolated pixel data is generally smoother than an image generate from the pixel data generated by the time base converter. An embodiment of the interpolator interpolates the source image in both vertical and horizontal directions. The interpolator uses a present scan line and a previous scan line to perform such interpolations. The interpolator uses the line qualifier signal to determine when the pixel data presently being received corresponds to a next scan line. That is, the line qualifier signal indicates when the pixel data presently being received corresponds to a next source image scan line.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention is described with reference to an upscaler which upscales a source image of one size (generally defined by height and width) to generate a destination image of another size. The source image can be of any type including, but not limited to, graphics images (for example, generated by computer applications) and video images (conventional signals generated for televisions). The source image is generally represented by one or more successive frames, with each frame including a plurality of scan lines. The destination image is generally displayed (e.g., in computer systems) or stored (e.g., digital cameras) or provided to other circuits for further processing. The destination image can also be represented in pixel data and can be eventually converted to analog form if required in the specific situation.

As used in the present application, an image may represent a complete frame or a portion thereof. Even though the present invention will be explained in the context of upscaling a complete frame/image, it will be apparent to one skilled in the art how to upscale only a portion of the frame/image by reading the description provided herein. Accordingly, the words frame and image as used herein also include corresponding portions thereof.

The upscaling can be performed without maintaining the aspect ratio of the source image as required in the specific context. Aspect ratio of an image generally refers to the ratio of the length of the image to the width of the image. The upscaler of the present invention can upscale images without having to maintain the aspect ratio of the source image. Accordingly, a user (either an end-user or application program or the like) typically has the option of specifying the length and breadth of the destination image without regard to the aspect ratio of the source image.

The upscaler achieves the conversion by using only a line buffer. In the example implementation described here, the line buffer includes memory sufficient to store two scan lines of data. In contrast, conventional convertors may require large size memories (typically known as frame buffers) to achieve similar functionality.

Due to the use of a line buffer in the upscaler of the present invention, the upscaler can occupy minimal space. In addition, due to limited amount of memory used, the amount of power consumed is also minimized. Therefore, the upscaler is particularly suited for flat-panel environments and other environments which are typically space and/or power constrained. However, it should be appreciated that the present invention can be used in several other environments as will be apparent to those skilled in the art by reading the description provided herein.

Figure 1:
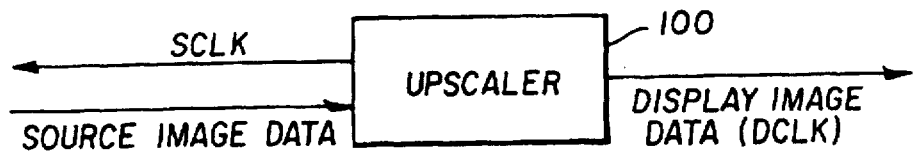
FIG. 1 is a block diagram of an upscaler of the present invention.

In FIG. 1, an embodiment of upscaler 100 is shown. Upscaler 100 upscales a source image. While upscaling a source image, upscaler 100 can operate in one of two modes, namely master mode and slave mode. In the master mode, upscaler 100 generates the clock signals (SCLK) to an external device providing the source image. The SCLK is used by the external device to sample the data. The sampled data can be either analog data (as explained in some examples below) or digital data (e.g., in disk drive technologies). In the slave mode, the SCLK signal is provided by the external device to upscaler 100. The manner in which upscaler 100 operates in master and slave modes will be clearer from the following description of an example embodiment.

The operation and implementation of an example embodiment of the present invention can be best understood from an explanation of the principles underlying the present invention. Therefore, the underlying principles will be described first. An example embodiment and an example method using the present invention will then be described. However, it will be apparent to one skilled in the relevant arts how to implement several other embodiments and methods without departing from the scope and spirit of the present invention by reading the description provided herein.

2. The Principle Underlying the Present Invention

Reference is made to FIG. 1, which illustrates the block diagram of an embodiment of upscaler 100 of the present invention. Upscaler 100 receives image data of a source image of a first size and upscales the image to a desired size. The image data received can be in either analog form or in digital pixel data form. Digital pixel data can be represented in one of several forms such as RGB or YUV data.

Upscaler 100 generates pixel data of the upscaled image at the same frame rate as the frame rate at which the source image is received. Frame rate generally refers to the number of frames of pixel data received/generated in a given period of time. The frame rate corresponding to source image reception is referred to as source image frame rate and the frame corresponding to the generation of destination image is referred to as destination frame rate. According to an aspect of the present invention, the source image frame rate and the destination image frame rate are designed to be equal.

By maintaining the same frame rate, upscaler 100 obviates the need for large buffers within. Thus, upscaler 100 upscales the source image using only a line buffer, thereby avoiding the need for frame buffers, which can consume relatively more space and power. In addition, frame buffer can be expensive. By employing the features of the present invention, upscaler 100 can upscale the source image without maintaining the aspect ratio of the source image.

To maintain the same frame rate, upscaler 100 (Of FIG. 1) generates pixel data for the destination image using a clock (referred to as DCLK for destination clock) which is different than a clock (SCLK for source clock) using which the source image is received. The DCLK frequency is computed as explained below.

For the source and destination frame rates to be equal, the corresponding periods to generate the destination frames (frame period) also need to be equal. Frame period is computed by multiplying the period to process (receive in case of source image, and generating in the case of a destination image) a single scan line with the number of scan lines in the frame. Assuming Th__src represents the time required for receiving a source image scan line, Th__dst represents the time required to generate a destination horizontal line, Vtotal__src represents the number of source scan lines in a source frame and Vtotal__dst represents periods to be equal, the following condition needs to be satisfied:

$$\text{Frame Period } (T_v) = Th\_src \times Vtotal\_src \quad \text{(Eq. 1)}$$
$$= Th\_dst \times Vtotal\_dst$$

$$\text{Thus, } Th\_dst = Th\_src \times Vtotal\_src/Vtotal\_dst \quad \text{(Eq. 2)}$$

Of these, if the source image is provided as digital pixel data, Th__src is readily computed by multiplying the number of pixels in a source scan line (Hcount__src) and the period (Tclk) for clocking each pixel of the source clock rate.

However, in the master mode, the source image may be received in the form of analog signal. Some calculations for master mode operation are now explained. The following information is generally known from user programming or other external indications:

Hsize__src: Number of source image pixels to capture in each source scan line

Vsize__src: Number of source lines to capture

Hstart__src: Horizontal position (in pixels) from where to Begin capturing

Vstart__src: Vertical position (in lines) from where to Begin capturing

Ta__src: Source scan line horizontal active time (i.e., Th src__Retrace time)

Hsize__dst: Number of valid pixels in a destination horizontal line

Vsize__dst: Number of valid lines in the destination image

To get Hsize__src samples over Ta__src period of time, total number of source clocks Htotal__src needs to be:

$$Htotal\_src=(Th\_src/Ta\_src) \times Hsize\_src \quad \text{(Eq. 3)}$$

From here, $$Tsclk=Th\_src/Htotal\_src \quad \text{(Eq.4)}$$

$$Fsclk=1/Tsclk=Htotal\_src/Th\_src \quad \text{(Eq. 5)}$$

Thus, Eq. 3 gives he total number of pixels to be sampled for each horizontal source scan line. Equations 4 and 5 give the period and frequency of the SCLK signal respectively.

Equations 3, 4, and 5 can be best understood by appreciating that the source image scan line has an active period and a retrace period. The image data is received only during the active period (Ta__src). Thus, to get Hsize__src samples during Ta__src period, SCLK needs to have a time period of Ta__src/Hsize__src, as can be readily observed by substituting Eq. 3 into the right side of the equal sign in equation 4. Notably, of the Htotal__src clocks, only Hsize__src clocks during Ta__src period are used for active sampling.

If Sclk phase-lock loop (PLL) is locked on incoming Hsync (Hsync and Vsync signals are well-known in the art) and needs to produce Htotal__src samples per line, the loop feedback divider needs to be programmed to divide the clock rate by Htotal__src.

Thus, $$Nsclk\_h=Htotal\_src=(Th\_src/Ta\_src) \times Hsize\_src \quad \text{(Eq. 6)}$$

If Sclk PLL is locked to Vsync, the loop divider needs to be programmed to divide by the total number of pixels in a frame.

Thus, $$Nsclk\_v=Htotal\_src \times Vtotal\_src=(Th\_src/Ta\_src) \times Hsize\_src \times Vtotal\_src \quad \text{(Eq. 7)}$$

In general, horizontal scaling $$\text{factor (HSF)} = \text{Hsize\_src}/\text{Hsize\_dst} \quad \text{(Eq. 8)}$$

It should be noted that according to the convention here, scaling factors have a value between 0 and 1. When there is no upscaling, the value is equal to 1. As the scaling factor decreases, the destination image size is correspondingly increased. In the master mode, the number of samples taken on each source scan line during Ta_src can be set equal to the number of valid pixels in each destination horizontal line in certain situations explained with example embodiments below. In this case, the horizontal scaling factor is equal to one. By relying directly on the source image for horizontal scaling, a better display quality is generally achieved.

In summary, if no digital horizontal upscaling is desired, $$\text{Hsize\_src} = \text{Hsize\_dst} \quad \text{(Eq. 9)}$$

and HSF=1

As to vertical scaling, vertical scaling factor (VSF)

$$= \text{Vsize\_src}/\text{Vsize\_dst} \quad \text{(Eq. 10)}$$

It will be noted from Eq. 1 above that $$\text{Vtotal\_src}/\text{Vtotal\_dst} = \text{Th\_dst}/\text{Th\_src} \quad \text{(Eq. 11)}$$

In addition, as upscaler 100 employs linear scaling, the ratio of active portion of the source frame to the SRC vertical period is fixed. That is, $$\text{Vsize\_src}/\text{Vtotal\_src} = \text{Vsize\_dst}/\text{Vtotal\_dst} \quad \text{(Eq. 12)}$$

From Equations 10 and 11 above, it follows:

$$\text{VSF} = \text{Vsize\_src}/\text{Vsize\_dst} = \text{Vtotal\_src}/\text{Vtotal\_dst} \quad \text{(Eq. 13)}$$

Thus, from Eq.1, it follows that $$\text{VSF} = \text{Th\_dst}/\text{Th\_src} \quad \text{(Eq. 14)}$$

That is, as the destination image has larger dimensions in relation to the source image, the time period of the destination clock is correspondingly decreased (i.e., its frequency is correspondingly increased). In turn, Th_dst is designed to be independent of the number of pixels in the destination image scan line by varying the frequency (or clock period) of the destination clock. That is, if the destination image has a large number of pixels, the clock frequency of the destination clock is accordingly chosen to be higher.

If one were to use Vsize dst_and Vsize_src of Equation 13 to compute VSF, the last destination image line can be incomplete (i.e., short). This line usually does not have valid data, and some systems can tolerate the short line. For example, some LCD panels typically ignore this last line. The advantage of using Equation 13 is that we can get the exact number of destination image lines, which is beneficial in some applications.

In contrast, if one were to use Vtotal_src and Vtotal_dst to compute VSF. VSF is computed as $$\text{VSF} = \text{Vtotal\_src}/\text{Vtotal\_dst} \quad \text{(Eq. 15)}$$

In this case, one will generally get an integer number of destination image horizontal lines. Such a feature is particularly advantageous in environments such as CRT terminals which are less tolerant of incomplete lines.

To address such an intolerance, upscaler 100 includes a mechanism to suppress such last incomplete lines. For example, if the height of a destination image is known, VSF is computed based on the equation below, in which the "int" function may truncate the fractional portion of the number:

$$\text{Vtotal\_dst} = (\text{int})\ ((\text{Vtotal\_src} \times \text{Height})/\text{Vsize\_src}) \quad \text{(Eq. 16)}$$

$$\text{Vsize\_dst} = (\text{int})\ ((\text{Vsize\_src} \times \text{Vtotal\_dst})/\text{Vtotal\_src}) \quad \text{(Eq. 17)}$$

Thus, the values of Vsize_dst and Vtotal_dst from Equations 16 and 17 are used to compute the VSF=Vsize_src/Vsize_dst.

The manner in which the clock period (Tdclk) for the destination clock is computed is now explained. From Equations 1 and 2, $$\text{Th\_dst} = \text{Th\_src} \times (\text{Vsize\_src}/\text{Vsize\_dst}) \quad \text{(Eq. 18)}$$

$$= \text{Th\_src} \times (\text{Vtotal\_src}/\text{Vtotal\_dst}) \quad \text{(Eq. 19)}$$

The considerations for choosing between Equations 18 and 19 are explained above with reference to computing VSF. Thus, the horizontal period on destination image side is determined by VSF.

The clock period (Tdclk) for Tdst can be computed from the below equation:

$$\text{Th\_dst} = \text{Tdclk} \times \text{Htotal\_dst} \quad \text{(Eq. 20)}$$

wherein Htotal_dst represents the number of pixels in a destination image horizontal line. From Equations 18–20, it follows $$\text{Tdclk} = (\text{Th\_src}/\text{Htotal\_dst}) \times (\text{Vsize\_src}/\text{Vsize\_dst}) \quad \text{(Eq. 21)}$$

$$\text{Htotal\_dst} = (\text{Th\_src}/\text{Tdclk}) \times (\text{Vsize\_src}/\text{Vsize\_dst}) \quad \text{(Eq. 22)}$$

From Equations 1, 4, and 20, we have $$\text{Tsclk} \times \text{Htotal\_src} \times \text{Vtotal\_src} = \text{Tdclk} \times \text{Htotal\_dst} \times \text{Vtotal\_dst} \quad \text{(Eq. 23)}$$

The ratio of Tclk and Sclk can be computed from Equation 23.

$$\text{Tdclk} = \text{Tsclk} \times (\text{Htotal\_src} \times \text{Vtotal\_src})/(\text{Htotal\_dst} \times \text{Vtotal\_dst}) \quad \text{(Eq. 24)}$$

From the above, it should be appreciated that the DCLK can be made to track SCLK automatically using a phase-locked loop (PLL). Thus, if there are transient distortions in the SCLK, the DCLK can be made to track SCLK, and the overall effect would be minimization of the resulting artifacts. This is an important advantage of the present invention.

DCLK can be made to track SCLK using a phase-locked-circuit such as one described in the co-pending application entitled, "A Method and Apparatus for Clock Recovery in a Digital Display Unit", which is referred to above in the section entitled, "Related Applications." A similar phase-locked loop circuit can also be used to generate SCLK in the master-mode as explained there.

Equation 24 further provides the number of SRC clocks (Nsclk) and DST clocks in a single frame.

$$\text{Nsclk} = \text{Htotal\_src} \times \text{Vtotal\_src} \quad \text{(Eq. 25)}$$

$$\text{Ndclk} = \text{Htotal\_dst} \times \text{Vtotal\_dst} \quad \text{(Eq. 26)}$$

From the above equations, Dclk PLL can be locked directly on the clocks ratio by implementing two dividers in a known way:

1. Divide the SCLK signal by Nsclk in the reference path of phase/frequency divider (PFD)

2. Divide DCLK signal by Ndclk in the feedback path of the PFD

As a further optimization, if Nsclk=a×GCD and Ndclk=b×GCD, where a and b are integers and GCD represents greatest common divider of Nsclk and Ndclk, the division of a clock frequency can be by factors of a and b for a superior operation of the PLLs.

It is to be noted that the appropriate choice of the DCLK time period/frequency allows the source image to be upscaled by different factors with respect to length and width of the source image. In other words, the aspect ratio need not be maintained while upscaling a source image and the user (or software) may be given the flexibility to specify different horizontal and vertical upscaling factors.

One method of upscaling the source image using the above described principles is explained now.

3. Method of the Present Invention

Figure 2:
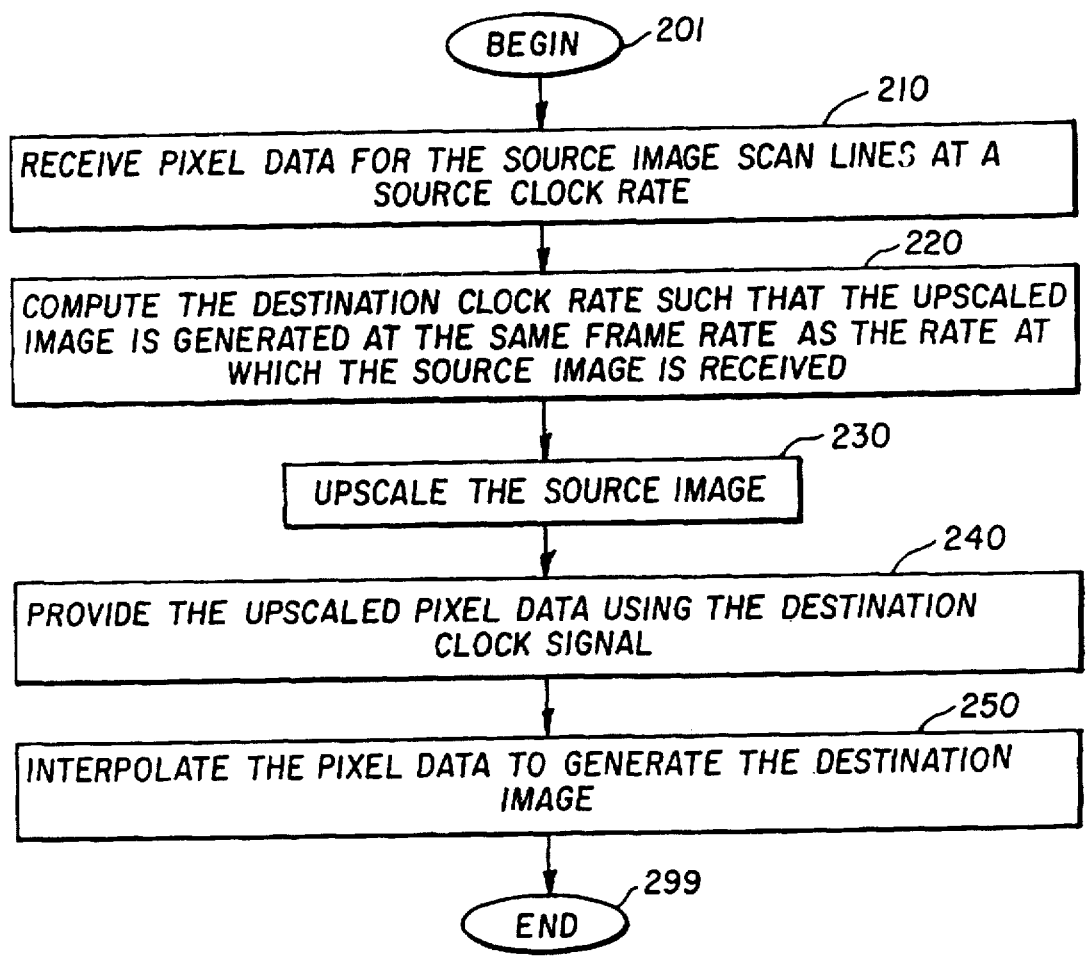
FIG. 2 is a flowchart illustrating a method of upscaling a source image in accordance with the present invention.

FIG. 2 is a flowchart illustrating a method of the present invention using the above explained principle. In step 210, the source image pixel data is received (by upscaler 100 of FIG. 1) at SCLK frequency. SCLK can be generated external to the upscaler 100 (e.g., coming from the external source generating the source image) or can be generated from within the upscaler 100.

In step 220, the DCLK period/frequency is computed according to the principle explained above. That is, the DCLK period is computed such that the rate at which the upscaled image frames are generated is the same as the frame rate at which the source image is received. During upscaling operations, DCLK frequency will be more than SCLK frequency as will be appreciated from the underlying principle explained above. Due to the faster clock, upscaler 100 will have sufficient time to perform the processing steps required for upscaling the source image.

In step 230, the source image is upscaled. In one embodiment, horizontal and vertical upscaling are performed by replication of the pixel data. However, it will be apparent to one skilled in the art how to use other upscaling techniques without departing from the scope and the spirit of the present invention. The additional pixel data for the upscaled image are generated in this step.

In step 240, the upscaled image pixel data is provided by upscaler 100 using the destination clock computed in step 220. As a result, the upscaled image is provided at the same frame rate as at which the source image is received. In step 250, post-upscaling steps are performed on the upscaled image data. If the upscaled image is for displaying on a display screen, the upscaled image pixel data can be interpolated to generate the destination image. By interpolating the pixel data, the destination image may more closely resemble the source image as is well understood in the art. Without interpolation, the upscaled image can be provided as the destination image. Thus, the destination image represents an upscaled version of the source image.

In general, the post-upscaling steps depend on the specific environment of usage. If the upscaler is used in an environment where the destination image is stored (e.g., in a video recorder), the post-upscaling steps may include adapting the upscaled image pixel data for proper storage on the recording medium.

Graphics images can be upscaled using the principle and method described above. An embodiment implementing the above method will be explained below. However, it will be apparent to one skilled in the art to implement various modifications to the embodiment without departing from the scope and spirit of the present invention.

4. An Upscaler

Figure 3:
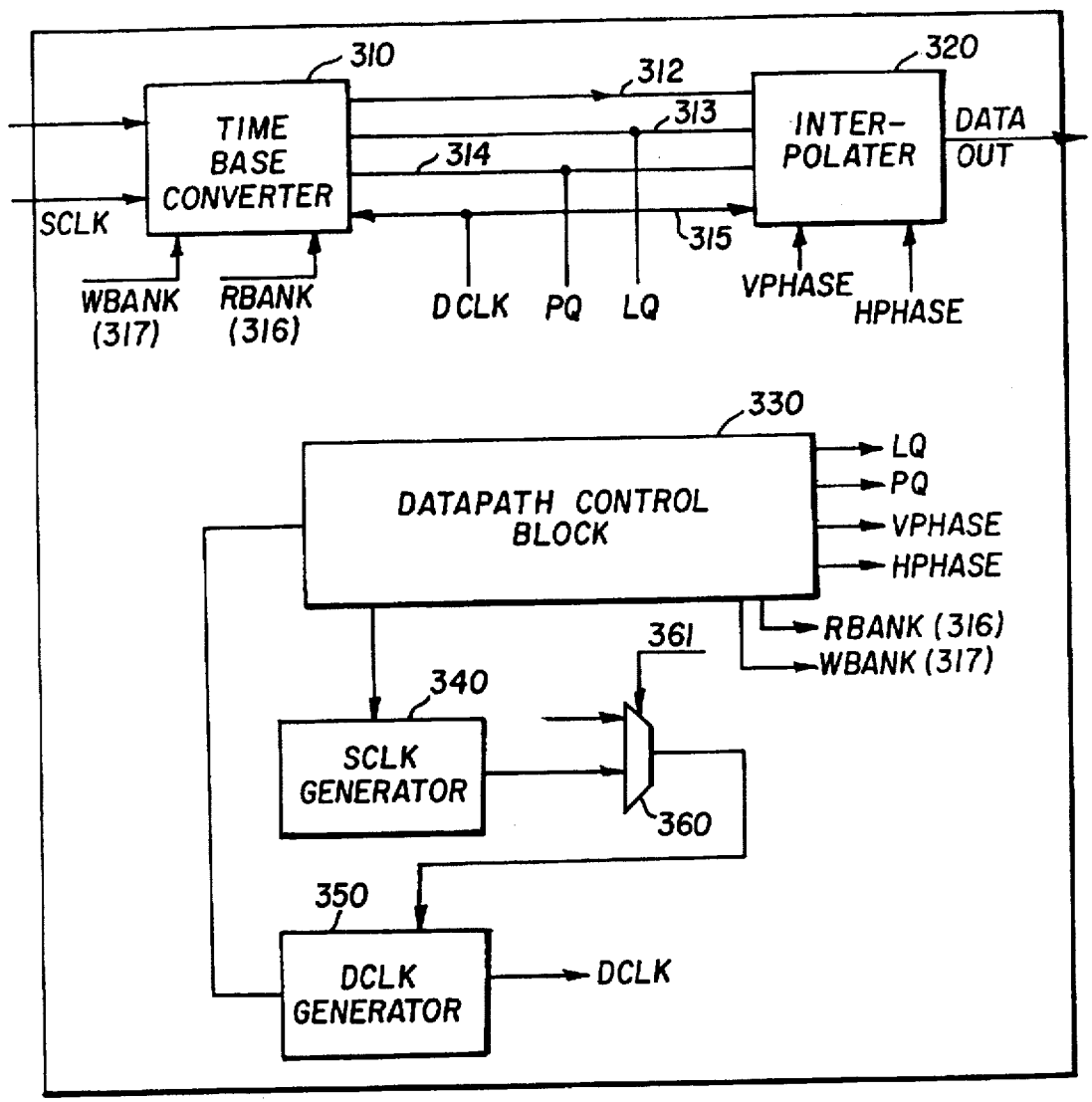
FIG. 3 is a block diagram of an embodiment of the upscaler of the present invention illustrating the sub-blocks therein.

FIG. 3 is a block diagram of an upscaler 100 comprising time base converter 310, interpolator 320, datapath control block 330, SCLK generator 340, DCLK generator 350, and multiplexor 360. Datapath control block 330 generates different signals to control and coordinate the operation of the other blocks. Some of the signals generated by datapath control block 330 will be explained in the context of the operation of the other blocks. Each block of upscaler 100 is explained in further detail below.

Interpolator 320 receives the pixel data on data line 312 from time base converter 310 and performs vertical and horizontal interpolation in a known way. In one embodiment, interpolator 320 uses two scan lines (referred to as previous scan line and present scan line) for the interpolation operation. However, it will be apparent to one skilled in the art by reading the description provided herein, how to implement interpolators which use different schemes for interpolation or to use a different number of scan lines without departing from the scope and spirit of the present invention.

The present scan line becomes a previous scan line when the next scan line of the source image is used for interpolation. Such a next scan line will be treated as the present scan line until a further next line is used by interpolator. At that time, the present scan line becomes the previous scan line with the further next scan line becoming the present scan line. Some of the pairs of scan lines are used to generate multiple scan lines of the destination image. Line Qualifier (LQ) line 313 indicates when the transition has to made to a next scan line.

Thus, LQ 313 indicates at a predetermined frequency that the same scan line should be used as a present scan line for interpolation during a subsequent iteration. The frequency at which the same line is used multiple times for interpolation depends on the vertical upscaling factor. For example, if three scan lines are being upscaled into four scan lines, one of the three scan lines is repeatedly used as a present scan line for interpolation. Also, interpolator 320 uses Pixel Qualifier (PQ) 314 to determine when to use pixel data received on line 312 as a next pixel data. In other words, pQ 314 qualifies the next pixel data when transferring (horizontal) scan line data to interpolator 320.

Time base convertor 310 accepts as input pixel data of a source image using SCLK signal and provides the received pixel data on data line 312 at a different time base. The output of time base convertor 310 represents an upscaled image. That is, the output contains pixel data in addition to those in the source image. All these pixel together are provided using the DCLK signal. Thus, time base convertor 310 receives data at one rate and provides the data at a different effective rate, and is thus said to have converted the data flow to a different time base. Interpolator 320 interpolates the pixel data so as to make the upscaled destination image more akin to the source image.

The pixel data are used by interpolator 320 as explained above. In one embodiment, time base convertor 310 provides to interpolator 320 the pixel data of a scan line multiple times corresponding to the number of times the scan line is repeatedly used as a present scan line for interpolation. LQ 313 and PQ 314 signal lines facilitate a consistent operation with interpotator 320. Time base convertor 310 will be explained in further detail below. Write Bank (WBANK) 316 and Read bank (RBANK) 317 signals will also be explained in detail there.

It should be understood that the signals between time base converter 310 and interpolator 320, and the manner in which the signals are used are examples only and should not be construed to limit the scope of the present invention. It will be apparent to a skilled artisan to implement various modifications without departing from the scope and the spirit of the present invention by reading the description provided herein.

SCLK generator 340 generates an internal SCLK signal which can be used for providing the clock signal for receiving the pixel of a source image. The internal SCLK signal can be provided, for example, when the source image is provided in an analog form and upscaler 100 converts the analog signal to digital data. This mode of operation is referred to as master mode operation.

SCLK signal can also be provided from an external source, in which case upscaler 100 is said to be operating in a slave mode. Multiplexor 360 selects either the external SCLK signal or the internally generated SCLK signal under the control of the signal line 361. Signal line 361 may be controlled by data path control block 330.

DCLK generator 350 generates the DCLK signal. The time period (frequency) of the DCLK signal is determined as explained above with the principles underlying the present invention. In addition, as explained above, DCLK clock signal has a frequency which is a constant times the frequency of the SCLK frequency. Accordingly, DCLK generator 350 may include a phase-locked circuit which locks/synchronizes with a signal based on the SCLK signal implementation of such a DCLK generator 350 will be apparent to one skilled in the art based on the description provided herein. DCLK signal drives the operation of the time base convertor 310 and interpolator 320.

The structure and operation of time base convertor 310 and interpolator 320 are explained in further detail below.

5. Time Base Convertor 310

Figure 4:
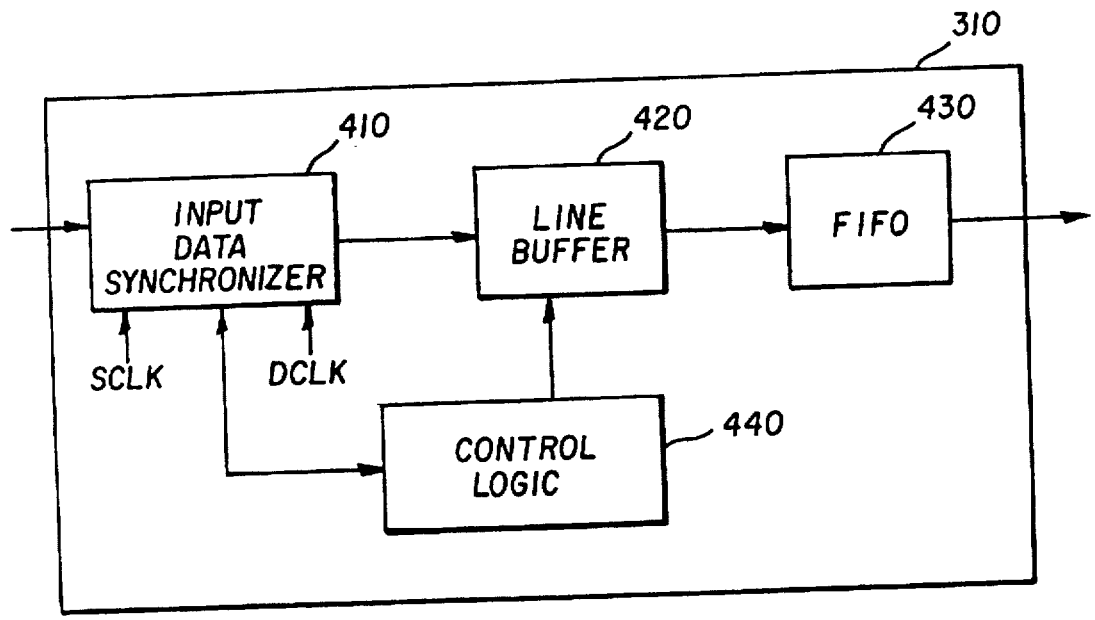
FIG. 4 is a block diagram providing an overview of the operation of a time base converter in accordance with the present invention.

FIG. 4 is a block diagram of time base converter 310 in one embodiment of the present invention. Time base convertor 310 includes input data synchronizer 410, line buffer 420, control logic 440, and FIFO 430. Input data synchronizer 410 receives source image pixel data at SCLK frequency and outputs the same data at DCLK frequency. Even though different clock signals are being used for receiving and transferring out the source image pixel data, it should be understood that the effective rate of transfer during both stages is the same because the same amount of data is being transferred during a given period in both cases. Input data synchronizer 410 can include components such as a register/FIFO/buffer for the re-synchronization process and can be implemented in a conventional way. SRC-HREF signal identifies the transition to a next scan line when receiving a source image pixel data.

Line buffer 420 receives and outputs the source image pixel data using DCLK clock signal. Even though the same clock signal is used for receiving and transferring out the pixel data, the data rates during the two stages are different. Specifically, some of the scan lines are transferred multiple times when transferring data out of line buffer 420. As a result, the effective data transfer rates at input and output are different in line buffer 420. At the input stage, pixel data is received at SCLK rate.

In one embodiment, line buffer 420 is implemented as a static random access memory (SRAM) with sufficient memory to hold two source scan lines. Line buffer 420 will be explained as having two banks or portions, with each bank being capable of storing one source scan line. As SRAM may be expensive, it is desirable to keep the SRAM size small. At the same time, line buffer 420 has to be of sufficient size to enable the data flow for the upscaler 100 to be operative. SRAMs are chosen usually because of the speed at which the stored data can be accessed. However, other types of memories depending on the specific design objectives of upscaler 100.

Line buffer 420 can be implemented to store a different number of scan lines depending on the specific implementation scheme chosen. Having the ability to store more scan lines generally simplifies the peripheral processing circuitry. On the other hand, having a lesser size line buffer may require more processing circuitry. Line buffer 420 may be implemented to store lesser data than pixel data corresponding to two scan lines. However, the peripheral circuitry required can be more complex than that explained here and/or the functionality provided an upscaler can be limited.

In an alternative embodiment, line buffer 420 can be implemented as a dual ported RAM also. Using a dual ported RAM can simplify the implementation of the time base converter. However, as is well known, dual ported RAMs can be expensive compared to SRAMs. The remaining discussion is provided in terms of using single ported SRAMs for that reason.

The two lines of the line buffer 420 may be viewed as two banks/portion, and the two portions together are generally used as a ping-pong buffer for write operations. That is, if a scan line of a source is written into one portion, the subsequent scan line is written into the other portion.

As to the read operation, the source image pixel data is read generally from one portion while source image pixel data is being written into the other portion. However, some of the source scan lines are read a second time also at least for reasons explained below.

The rate of reading data from line buffer 420 is higher than the rate at which pixel data is written while upscaling the source image because the same scan line data may be read multiple times for interpolation as already noted. In this regard, it should be noted that even though the data is clocked into line buffer 420 using DCLK, the total amount of data written during a given period is no more than the data received by upscaler 100 at SCLK frequency. Therefore, during some of the clock cycles, no pixel data is clocked into (or written into) the line buffer 420.

Thus, the speed of reading pixel data from line buffer 420 can be greater than the speed of writing the data. If reading were to begin in the same portion after writing has begun, a 'overrun' condition may result. The overrun condition is explained with reference to an example. Assume that a first scan line is being written into the first bank and then the reading process begins in the same bank. The first scan line is initially read. However, as the speed of reading is higher than the speed of writing, the read process may complete reading data corresponding to the first scan line presently being written and may then access additional data which does not relate to the first scan line.

As will be readily appreciated, erroneous data is read in such a situation and can lead to incorrect displays. That is, line(s) generated and/or displayed based on this data will include pixel data from one scan line for some portion, and will have pixel data from other scan line for the remaining portion.

Overrun condition is avoided by recognizing that the writing can begin in the same portion of line buffer 420 after reading has begun in that portion. This is because reading is performed at equal or faster speed than writing. In addition, there may be an additional constraint in that scan lines should be provided to interpolator 320 at a sufficient rate to generate the destination image at the same frame rate as that of the source image. Thus, in one embodiment, the pixel data for a scan line of a source image is read twice if beginning reading from the other portion may lead to a race condition.

The number of times a scan line is read multiple times depends on the vertical scaling factor. If five lines are being upscaled into seven lines, two of the five source scan lines will be provided twice to interpolator 330. As will be clearer from the description below, line qualifier signal enables a consistent operation between interpolator 320 and time base convertor 310 in accordance with this solution for addressing race conditions which may otherwise result.

FIFO 430 is used to resolve conflicts between read and write cycles into line buffer 420. That is, as an embodiment of line buffer 420 has only a single port which is shared for reading and writing, a mechanism needs to be in place to ensure both read and write operations can be performed from/into line buffer 420. As a general principle, data is read ahead into FIFO 430 from line buffer 420 to ensure the pixel data is available for interpolation. While this data is being used for interpolation, pixel data is written into and read from the line buffer 420. As there may be some delay in reading data out of input data synchronizer 410, input data synchronizer 410 may also include a FiFO/buffer of sufficient size.

However, since data is received into input data synchronizer at a slower clock rate (i.e., SCLK) during upscaling, several implementations of FIFO 430 will be apparent to one skilled in the relevant art from the description provided herein. One example implementation of FIFO 430 and the related control circuitry will be explained in further detail below. It should be noted that FIFO 430 may not be required if a dual ported RAM is used for line buffer 420. Dual ported RAMs may be undesirable due to the cost and space constraints.

Control logic 440 coordinates and controls the operation of input data synchronizer 410, line buffer 420, and FIFO 430. Control logic 440 may be implemented as a part of data path control block 330 also. Further details of control logic 440 will be clear from the description below.

6. Interpolator

Figure 5:
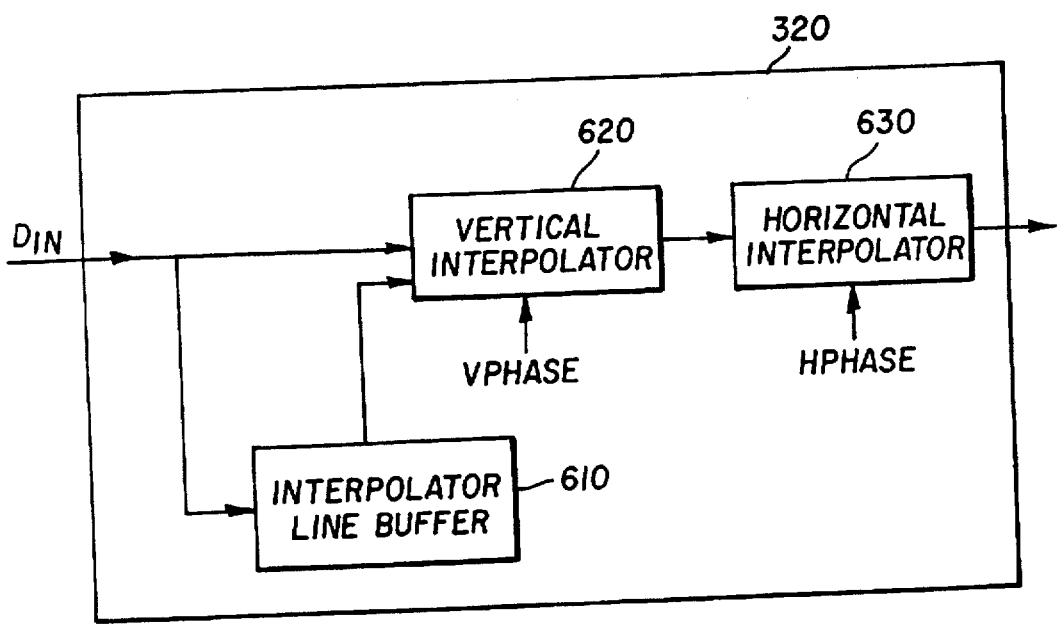
FIG. 5 is a block diagram of an interpolator for interpolating the upscaled image pixel data.

FIG. 5 is a block diagram of an embodiment of interpolator 320 including interpolator line buffer 510, vertical interpolator 520, and horizontal interpolator 530. This example implementation of interpolation uses only two scan lines to generate additional scan lines of data.

Thus, vertical interpolator 520 receives as input a current line (present line) pixel data and a previous line pixel data, and performs vertical interpolation. The current line pixel data and the previous line pixel data are received from time base convertor 310 (or FIFO 430) and interpolator line buffer 510 respectively. Vertical interpolation can be performed in a known way to generate additional horizontal lines.

The Vphase (vertical phase) value may determine the extent to which each of the current and previous scan lines contribute to the additional pixel data values generated. In this example implementation, assuming the Vphase value is 0.25, the additional scan line generated may be computed as ¼ X previous scan line +¾ current scan line. The manner in which Vphase can be computed in one embodiment will be explained in detail below.

The output of vertical interpolator includes the same number of lines as the final destination image. However, each line may need to be further interpolated in the horizontal direction to generate the final destination image.

Horizontal interpolator 530 receives pixel data for each scan line (including the additional lines generated due to vertical upscaling) and performs horizontal interpolation. In this embodiment, only pixel data from the scan line received are used for generating the additional pixel data for the horizontal direction. However, it will be apparent to one skilled in the relevant arts by reading the description provided herein how to implement other schemes for horizontal interpolation without departing from the scope and spirit of the present invention.

As adjacent pixel data are received consecutively, horizontal interpolator 530 may include a small buffer to store data for a few pixels. The extent to which each pixel contributes to the additional pixel data may be determined by the HPHASE value. The stored data can be used for horizontal interpolation. Horizontal interpolator 530 generates pixel data at a rate of one pixel data per DCLK clock cycle. As DCLK frequency has been computed to ensure that the destination frame rate is equal to source frame rate, the interpolated pixel data is generated at a frame rate equal to the source frame rate.

Interpolator line buffer 610 provides the previous scan line to vertical interpolator 620. As Interpolator 620 uses only one previous scan line for generating additional scan lines of data, interpolator line buffer 610 includes sufficient memory to store only one horizontal scan line of data. The assertion of Line qualifier (LQ) signal causes interpolator line buffer 610 to replace its memory with pixel data of the present scan line. Once updated, the newly stored scan line data operates as previous scan line data until LQ signal is asserted once again.

Even though interpolator 320 is explained as using only two scan lines for generating additional pixel data, it will be apparent to one skilled in the relevant art to implement interpolators which use more scan lines or a different scheme than that described here based on the description provided herein without departing from the scope and spirit of the present invention. By using more scan lines, the interpolation operation may be more computation intensive, but may result in a better display quality. For such different implementations at least the interpolator line buffer 510 will be of a different size.

Figure 6:
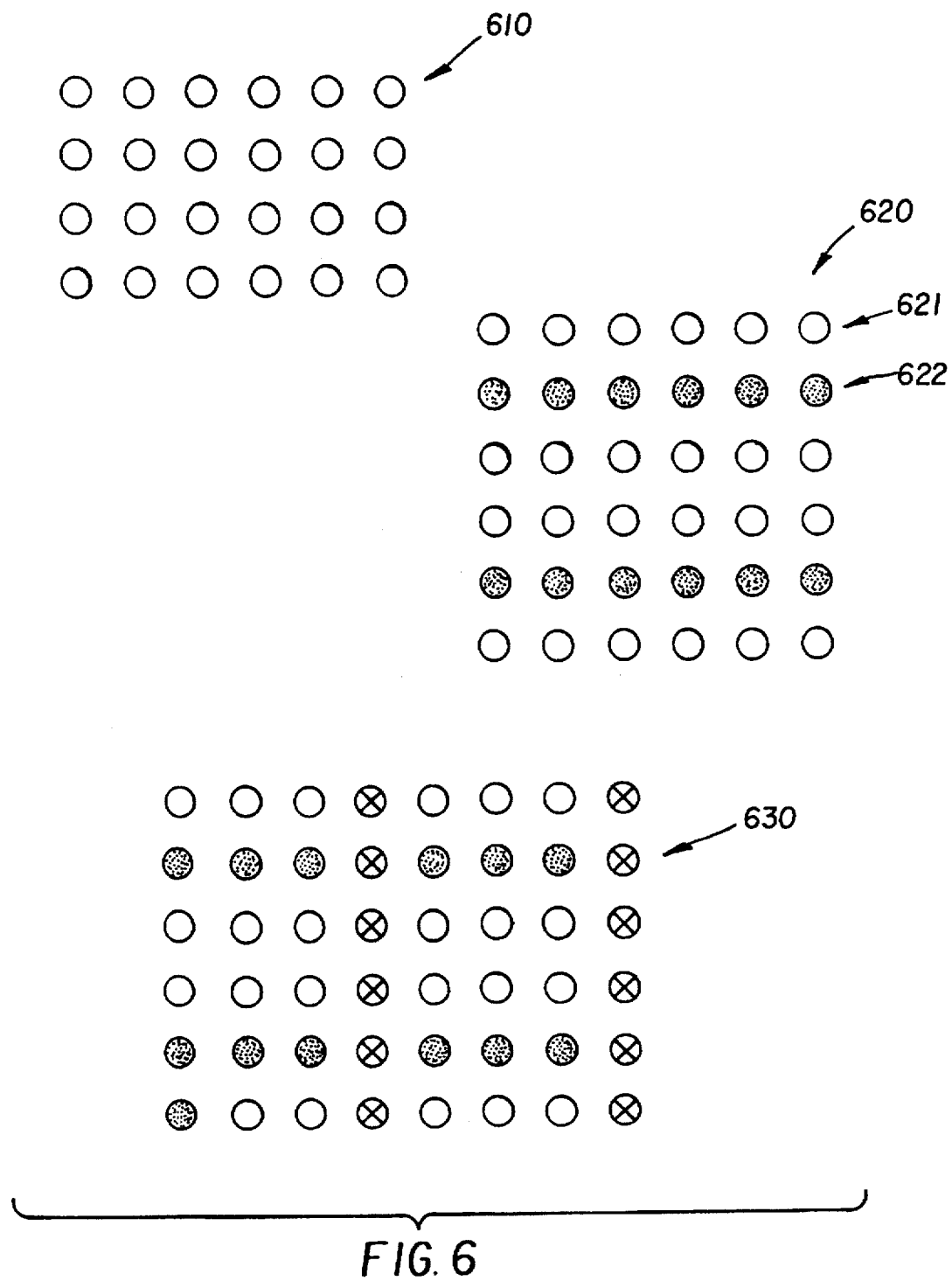
FIG. 6 is a diagram illustrating the sequence in which additional pixel data are generated as a result of interpolation in accordance with the interpolation scheme of an example embodiment.

FIG. 6 illustrates in further detail the sequence in which pixels are generated during interpolation in accordance with the above description. The source image comprising four horizontal source image lines, with each line including eight pixels is shown at 610. In this example, the image is upscaled by ½ in the vertical direction and ⅔ in the horizontal direction. After vertical upscaling, the pixel data is shown at 620. In 620, each pair of scan lines is shown upscaled to three scan lines. The additional pixel data generated is shown in dark circles. During horizontal scaling, three pixel data sets are converted into four pixels due to the ⅔ horizontal scaling factor. The additional pixel data generated from horizontal upscaling is shown with a X symbol in a circle. The upscaled pixel data is represented at 630 in FIG. 6. Thus, after the horizontal and vertical upscaling are completed, pixel data for the upscaled image is generated. Display signals are generated based on this pixel data.

7. Data Flow Rate in Various Stages of Upscaler 100

Figure 7:
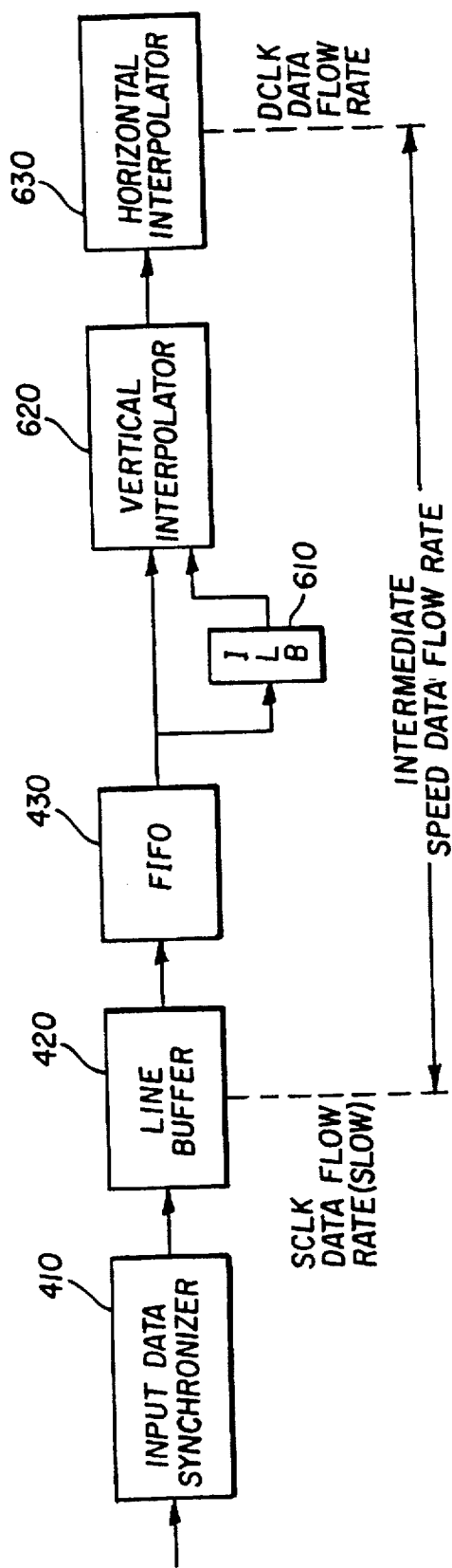
FIG. 7 is a block diagram with the components of time base converter and interpolator shown in tandem to illustrate the data flow rates in different parts of an upscaler in one embodiment of the present invention.

The operation of the above described embodiments can be further explained by illustrating the data flow rates at various stages of upscaler 100 in one embodiment. The components of time base converter 310 and interpolator 320 are shown in tandem in FIG. 7. As already noted, input data synchronizer 410 receives data using SCLK signal, but sends the data to line buffer 420 at DCLK frequency. However, the rate of data flow is the same at the input and output sides of input data synchronizer 410. The rate corresponds to the SCLK frequency.

Line buffer 420 receives data at the same data flow rate as the output rate of line buffer 420. However, the data transferred out of line buffer 420 includes some of the additional pixel data generated for the upscaling operation. The line and pixel qualifier signals qualify next line and pixel data respectively while pixel data is transferred to vertical interpolator 620. From here on, the data flow is shown to be at an intermediate rate.

However, horizontal interpolator 630 generates one pixel per clock cycle due the manner in which DCLK clock period has been chosen. Thus, data is generated at a full DCLK frequency. Thus, the output portion of horizontal interpolator 630 is shown as operating at a high data flow rate.

The manner in which line and pixel qualifier signals are generated is explained in further detail below.

8. Generating LQ, PQ, HPHASE, and VPHASE

Example embodiments to generate Line Qualifier, Pixel Qualifier, Hphase, and Vphase values are explained here. It should be understood these values and signals can be generated in several other ways without departing from the scope and spirit of the present invention.

Figure 8:
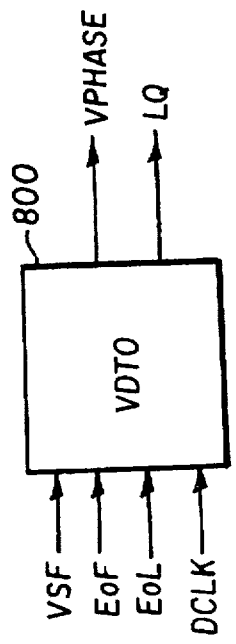
FIG. 8 is a block diagram of a VDTO illustrating one example way of generating line qualifier signal and Vphase value.

FIG. 8 is a block diagram of a Vertical Discrete Time Oscillator (VDTO) 800 which accepts as inputs vertical scaling factor (VSF), DCLK signal, End-of-Frame (EOF) signal, and End-of-Line (EOL) signal. DTOs are well known in the art and can also be referred to as phase accumulators. VSF is computed as the number of lines source image divided by the number of lines in the destination image. Thus, if two lines in the source image are being upscaled into three lines in the destination image. VSF will be equal to ⅔.

VDTO recursively adds the VSF value to a register when the end-of-line (EOL) signal is asserted. Any carry over (when the result of addition exceeds or equals one) resulting from the addition is generated as the Line Qualifier Signal. The remainder value of the addition is generated as VPHASE value. When the EOF signal is asserted the accumulated value (VPHASE) is set to zero. Upon successive assertions of EOL signal, the VSF value is recursively added to generate the VPHASE and LQ signals.

Thus, assuming a VSF value of ⅔, after a first EOL signal (pulse) is received, VPHASE value equals ⅔ and LQ is set to 0. After second EOL signal is received, VSF value equals to ⅓ and LQ is set to 1. After a EOL signal is received, VSF value equals 0 and LP is set to 1. The cycle is repeated several times. Thus, the vertical lines are qualified two out of three times. The remaining one time, a line is repeated for interpolation.

Figure 9:
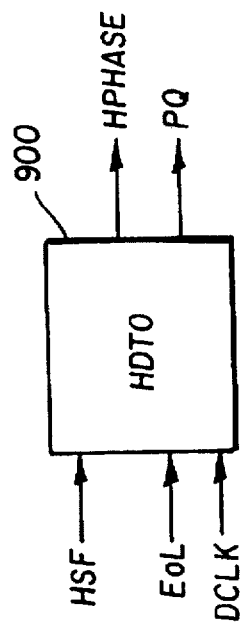
FIG. 9 is a block diagram of a HDTO illustrating one example way of generating pixel qualifier signal and Hphase value.

FIG. 9 is a block diagram of a horizontal discrete time oscillator (HDTO) 900. HDTO 900 operates similar to VDTO 800, but operates from different parameters to generate the Pixel Qualifier (PQ) signal. HDTO 900 accepts as inputs the Horizontal Scaling Factor (HSF), DCLK signal and end-of-line (EOL) signal, and generates the horizontal phase (HPHASE) and Pixel Qualifier (PQ) signals. HSF is computed by dividing the number of pixels in each source scan line by the number of pixels in each destination scan line. The HSF value is recursively added to generate the Pixel Qualifier (equal to carry over value) and the HPHASE value. The accumulator holding the result of addition is reset when the EOL signal is received.

9. Illustrative Timing Diagram

Figure 11:
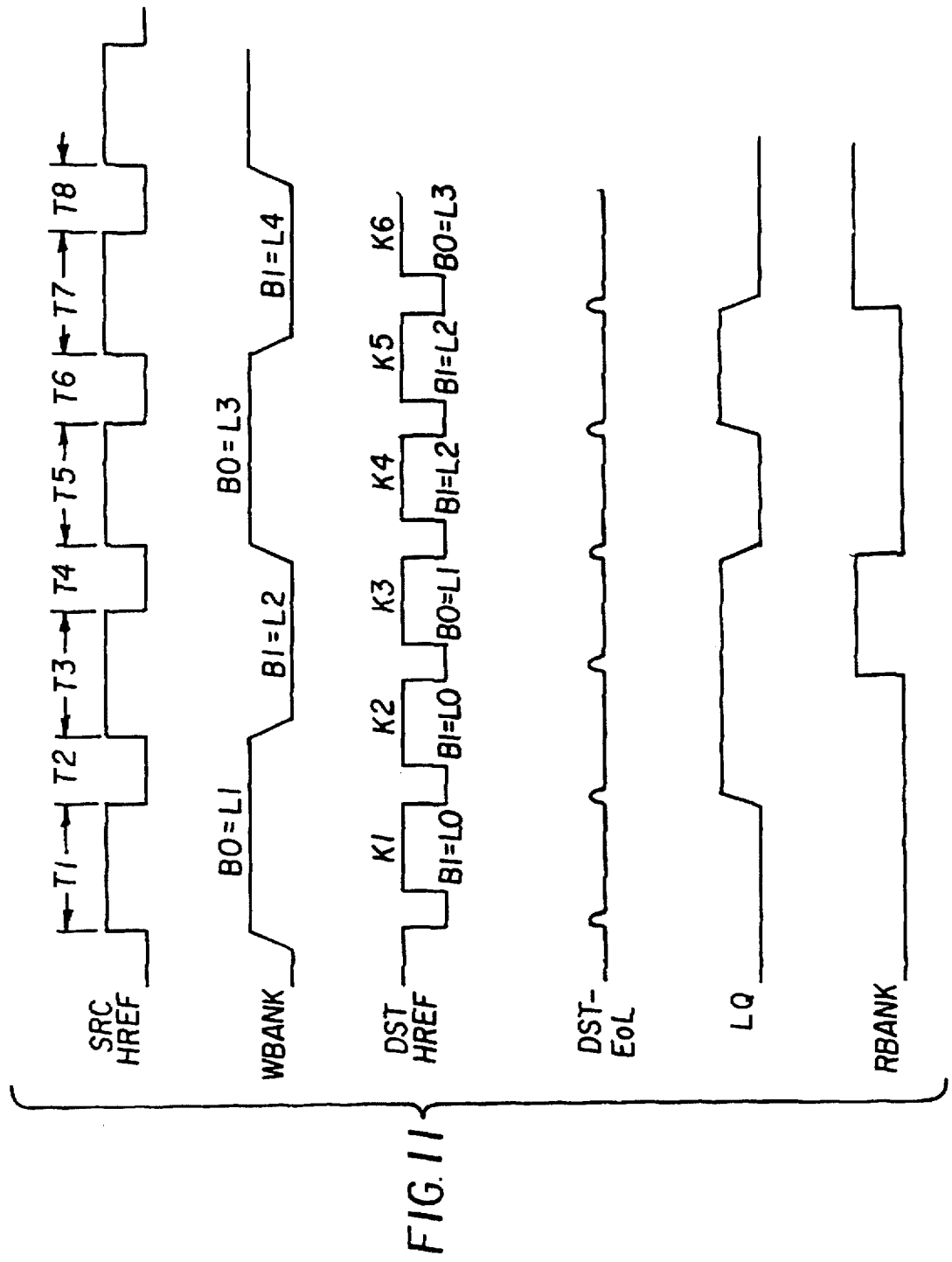
FIG. 11 is a timing diagram illustrating the flow of data in various components of upscaler of the present invention.

The data flow and operation of upscaler 100 is further illustrated with a timing diagram shown in FIG. 11. The time scale of SRC-HREF signal is divided as T0 through T8. T1, T3, T5, and T7 represent periods during which pixel data corresponding to source image are received. T2, T4, T6, and T8 represent the horizontal retrace periods while receiving the source image. DST-HREF signal represents the active portion of destination image horizontal lines, and the transitions from one destination image horizontal line to the next. DST-HREF signal is shown divided as cycles K1–K6.

The WBANK signal determines which of the two banks the source image pixel data is being written into. For purposes of illustration, we will assume that line buffer 420 has two banks B0 and B1 and that pixel data is written into B0 when WBANK signal is high and into B1 when WBANK signal is low. Also, RBANK signal controls the bank from which a source image scan line is read.

The WBANK and RBANK signals are explained with reference to an example. For this example, we will assume that source image includes consecutive scan lines L0–L4 and that line buffer 420 includes two banks B0 and B1 as already noted. According to the indication on WBANK signal, L0 is written into B1 at a period before T0. L1 and L3 are written into B0 during T1–T2 and T5–T6 periods respectively. L2 and L4 are written into B1 during T3–T4 and T7–T8 periods respectively.

As further explained above, a read operation is performed from a bank different from a bank into which data is presently being written into. In one embodiment, the value of RBANK signal is controlled to meet this basic condition. Thus, during DST-HREF cycles K1 and K2, pixel data is read from bank B1. During cycle K3, pixel data is read from bank B0. During DST-HREF cycles K4 and K5, pixel data is read from bank B1. The RBANK signal level indicates the bank from which data is read during each DST-HREF cycle.

The sequence in which each of these lines will be provided as a 'present line' for interpolation will be explained below. Once a given line is replaced from being a 'present line', that line will automatically be the 'previous line' for interpolation due to the implementation chosen above.

A high value of LQ signal indicates to the interpolator that the interpolation function has to be advanced to the next scan line after the end of the present SRC-DST cycle. In response, interpolator updates the interpolator line buffer to store the current scan line. As a result, the stored scan line is available as a previous line for subsequent interpolation cycles. In one embodiment, LQ signal indicates whether the same line should be used for interpolation during a subsequent DST-HREF cycle. According to one convention, a low signal level indicates that the present scan line should be repeated as the present scan line.

Thus, as LQ signal is low during cycle K1, reading is repeated from bank B1 during line 2. As LQ is in a high signal level during cycle K2, reading is switched from bank B1 to B0 after cycle K2. LQ remains at a high signal level during K3. Accordingly, reading is switched from B0 to B1 at the end of cycle K3. The remaining cycles are also explained similarly.

An example implementation of time base converter 310 is explained in further detail now.

10. Example Implementation of the time base converter

Figure 10:
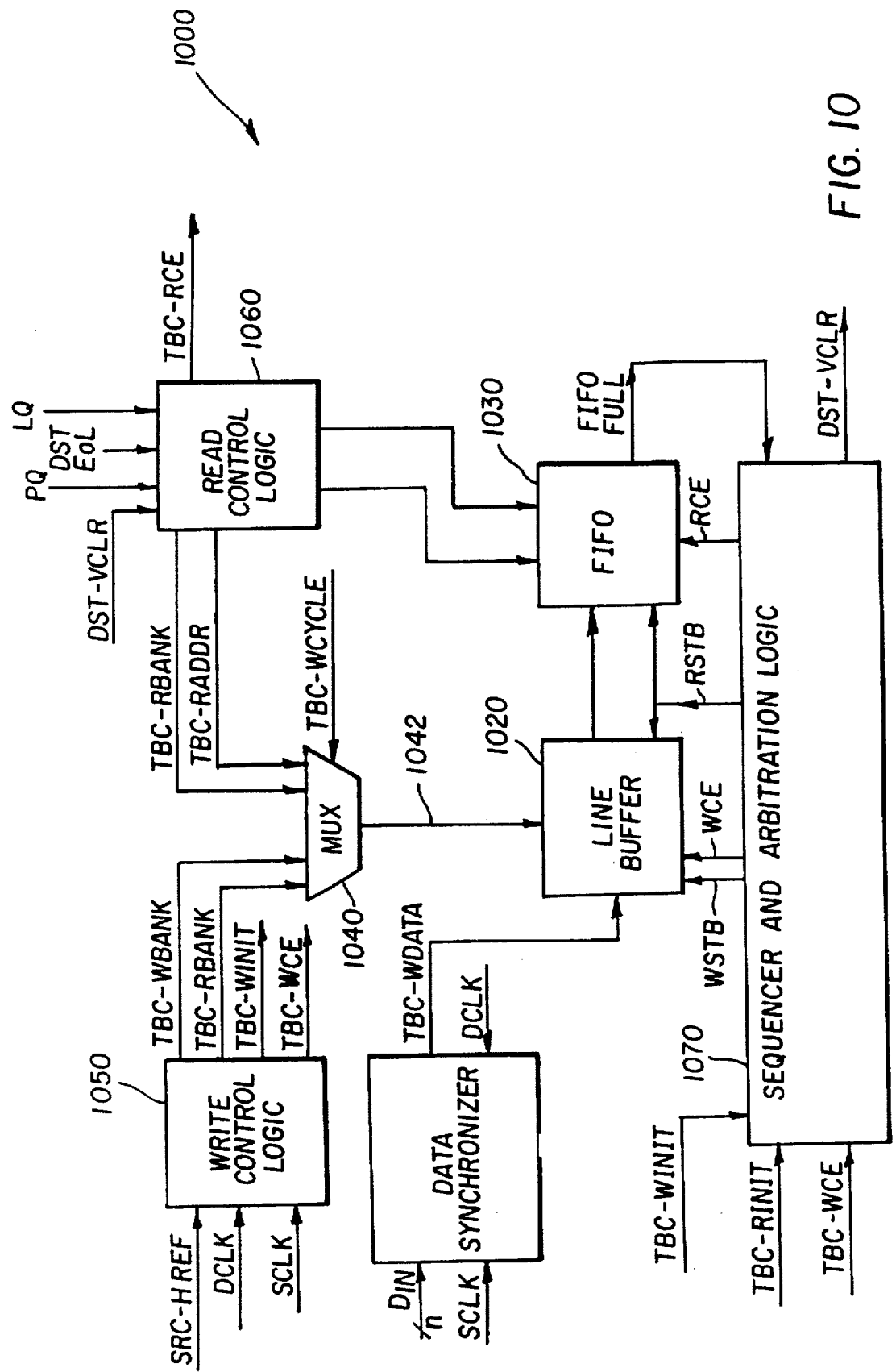
FIG. 10 is a block diagram of an example implementation of a time base converter.

FIG. 10 is a block diagram illustrating in further detail the implementation of an embodiment of time base converter 310 in accordance with the present invention. Time base converter 310 includes data synchronizer 1010, line buffer 1020, FIFO 1030, multiplexor 1040, write control logic (WCL) 1050, read control logic (RCL) 1060, and sequencer and arbitration logic (SAL) 1070.

The structure and operation of data synchronizer 1010 and line buffer 1020 are similar to data synchronizer 410 and line buffer 420 described above, and will not be repeated here in the interest of conciseness. The three logic circuits 1050, 1060, and 1070 may be implemented completely or partially as a part of datapath control block 330. The three logic circuits, FIFO 1030, and multiplexor 1040 will be described in further detail below.

In one embodiment, FIFO 1030 includes sufficient memory to store at least four pixel data. FIFO 1030 drives the FIFO-full signal to a low level when the remaining amount of data falls below a certain level. SAL 1070 controls accesses to line buffer 1020, and sequences the read and write transactions. In an example embodiment, the read and write cycles to line buffer 1020 are interleaved. This may simplify the implementation logic for SAL 1070.

Even though multiplexor 1040 is shown as a single block, it should be understood that it is typically implemented as several multiplexors. Multiplexor 1040 selectively transfers onto the output line 1042 information corresponding to read transactions or write transactions under the control of TBC-Wcycle signal. TBC-Rbank signal indicates the specific bank (B0 or B1) to read from. Similarly, TBC-Wbank signal corresponds to a write operation. The TBC-Raddr and TBC-Waddr buses hold the memory address within the bank to access. Each word or byte may be accessed at a time depending on the specific implementation of the line buffer 1020.

Write control logic 1050 determines the transition from one scan line to another based on the SRC-HREF signal and generates a TBC-WBANK signal to cause scan lines to be written into alternate banks of line buffer 1020. TBC-WADDR specifies the address in line buffer 1020 to write to. TBC-WINIT signal indicates the beginning of a line and causes the write address to be set to zero. TBC-WCE signal causes the pixel data to be written into line buffer 1020. As DCLK operates at a faster rate than SCLK, TBC-WCE selects the specific cycles within the DCLK signal during which write operations are actually performed.

Read control logic 1060 operates using pixel qualifier and line qualifier signals which have been explained in detail above. DST-VCLR signal indicates a beginning of a destination image frame. TBC-RCE (read clock enable) signal indicates the clock cycles during which pixel data is read from line buffer 1020.

SAL 1070 interfaces with write control logic 1050 and read control logic 1060 to coordinate and control the read and write transactions to line buffer 1020. The write clock enable (WCE) signal indicates time periods during which valid data can be written into line buffer 1020. A strobe on the write strobe (WSTB) signal causes the data to be written into line buffer 1020. The read clock enable (RCE) and read strobe RSTB operate similarly to cause pixel data to be read from line buffer 1020. RINIT is active before the beginning of generation of a new destination horizontal line.

Using the description provided above, it will be apparent to one skilled in the art how to construct several embodiments of upscaler 100. Upscaler 100 can be used in several environments. Some example environments will be described below.

11. Upscaler 100 as a part of Integrated Circuits Which Generate Display Signals Upscaler 100 can be used in several integrated circuits which generate upscaled destination images corresponding to source images. Display signals may be generated using the pixel data in the destination images. Some example implementations are described below. However, it should be understood that upscaler 100 can be implemented in several other environments without departing from the scope and spirit of the present invention.

Figure 12:
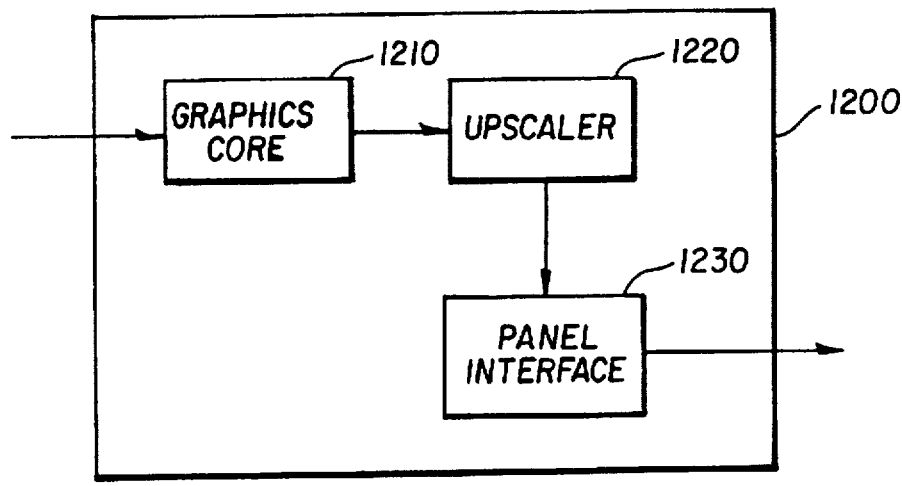
FIG. 12 is a block diagram of an embodiment of graphics controller circuit including an upscaler of the present invention.

FIG. 12 is a block diagram of an example integrated circuit 1200 which can be used in computer systems to display the upscaled image integrated circuit 1200 is usually located on a mother board which also houses other components such as a microprocessor and random access memory (RAM). Integrated circuit 1200 includes graphics core 1210, upscaler 1220, and display interface 1230. Upscaler 1220 is similar to upscaler 100, but can include specific modifications and/or additions to operate in conjunction with other components here.

Graphics core 1210 generates source image pixel data in formats such as RGB or YUY. Graphics core 1210 can be conventional and an example of core 1210 can be found in several graphics controller chips available in the market place. For example, core 1210 may correspond to a VGA core implemented in graphics controller chip CL-5436 available from Cirrus Logic, Inc., 3100 West Warren Ave., Fremont, Calif. 94538. The VGA core generally provides pixel data and may perform graphics operations (e.g., raster operations) in the process of providing the pixel data. Graphics core 1210 generally generates pixel data in well known VGA/SVGA modes.

The image represented by this pixel data may need to be upscaled, for example, as the display screen may be an LCD panel having a resolution of 1280×1024. Thus, in one embodiment, upscaler 1220 performs such an upscaling operation. Upscaler 1220 can upscale the source image to 1280×1024 irrespective of the resolution of the source image. That is, the display panel is filled with the display image due to the upscaling function provided by upscaler 1220. For example, if the integrated circuit 1200 is used in a note-book/laptop computer (available from companies such as Compaq, International Business Machines, Toshiba), upscaler 1220 causes the LCD display to be filled with the image.

Display interface 1230 receives the pixel data of the upscaled image and generates display signals for the display screen. The display screen can be a LCD panel or a CRT terminal or the like. Upscaler 1220 can be integrated within core and/or be implemented as another circuit. For example, while generating display signals for a CRT terminal, upscaler may be integrated within the core 1210. On the other hand, if the display signals are being generated for a LCD panel, upscaler may be included specifically for converting display data generated for VGA-type format to LCD panel resolution. Display interface 1230 generates display signals depending on the type of the display screen in a known way. Thus, upscaler of the present invention can be used to implement integrated circuits for LCD panels, CRT terminals, LCD projectors, or similar display screens. An integrated circuit can be implemented to generate display signals for both of these types of display screens.

Figure 13:
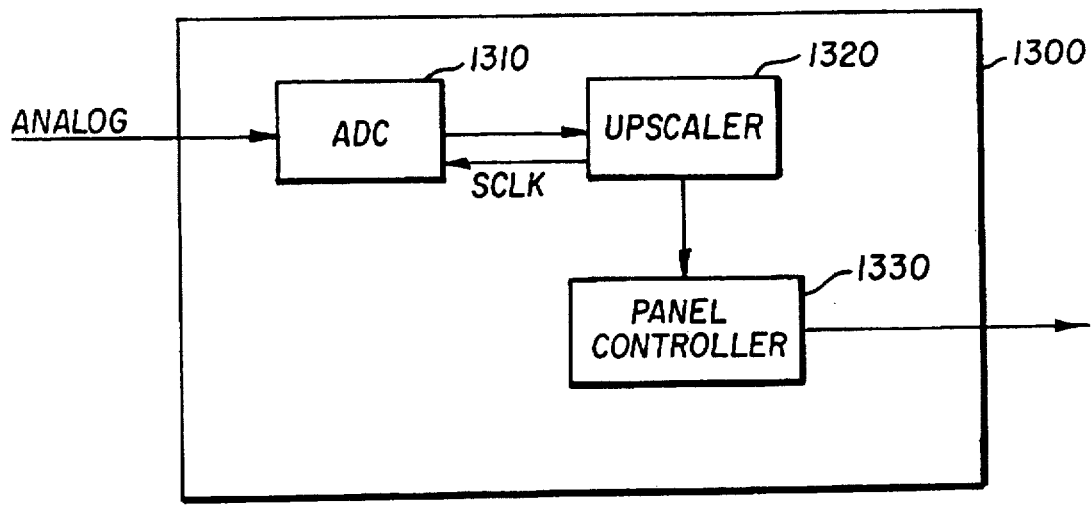
FIG. 13 is a block diagram of another embodiment of a graphics controller circuit including an upscaler of the present invention.

FIG. 13 is a block diagram of an alternative embodiment of integrated circuit 1300 which is adapted for implementation in with another type of display units such as flat monitor displays. Flat monitors are increasingly being employed with conventional desk-top computer systems and television systems. Integrated circuit 1300 is typically located within the display unit (or on the panel glass) of the system being used in.

Integrated circuit 1300 receives source image data in analog form and generates display signals to flat monitors therefrom in accordance with the present invention. Integrated circuit 1300 includes analog-to-digital converter (ADC) 1310, upscaler 1320, and panel controller 1330. ADC 1310 and panel controller 1330 can be conventional. Upscaler 1320 is akin to upscaler 100, but modified to interface with the specific components provided herein.

ADC 1310 receives data of a source image in an analog form and provides digital data representative of the source image in a conventional manner. Upscaler 1320 can provide the SCLK clock to ADC 1310 as explained above. In one embodiment, the SCLK frequency is provided so as to avoid further horizontal upscaling. That is, each input scan line is sampled the same number of times as the number of pixels in the destination image. By relying on the source image for providing the horizontally upscaled destination image pixels, a better display quality is generally achieved.

However, the above described sampling scheme may not be particularly suitable if the source image contains unwanted spectral components. If such spectral components may be present, each source image scan line is sampled at the original source image sampling rate.

Upscaler 1320 generates DCLK frequency in accordance with the concepts explained above and the image is upscaled in a vertical direction as above. Thus, using such DCLK signal, upscaler 1320 generates the pixel data for the destination image. Panel controller 1330 receives the pixel data from upscaler 1320 and generates the display signals to flat monitors in a known way. Thus, the present invention can be used in flat monitors also as explained here.

The integrated circuits explained above can be used in several systems. Some example systems will now be described. However, it should be understood that the present invention can be implemented in several other types of systems without departing from the scope and spirit of the present invention.

12. Computer Systems Using the Integrated Circuits of the Present Invention

Figure 14:
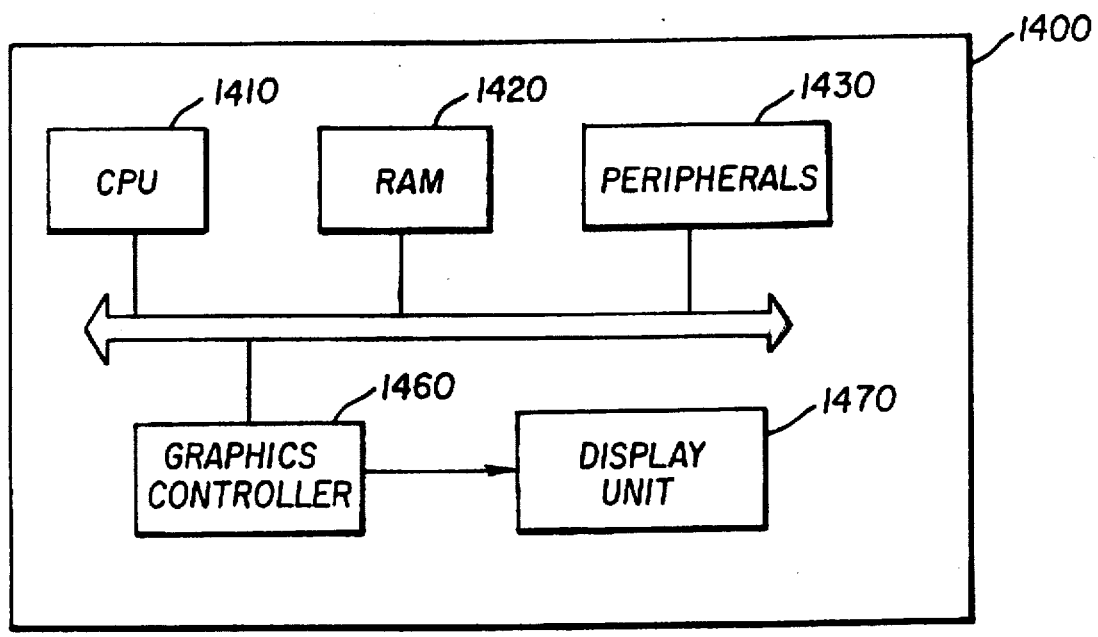
FIG. 14 is a block diagram of an embodiment of a computer system using an upscaler of the present invention.

FIG. 14 is a block diagram of an example computer system 1400 using an upscaler of the present invention. Computer system 1400 includes central processing unit (CPU) 1410, random access memory (RAM) 1420, one or more peripherals 1430, graphics controller 1470, and display unit 1470. All these components communicate over bus 1450, which can in reality include several physical buses connected by appropriate interfaces.

CPU 1410, RAM 1420 and peripherals 1430 are conventional in one embodiment of the present invention. CPU 1410 can be, for example, a processor such as a Pentium Processor available from Intel Corporation. RAM 1420 represents the system/main memory for storing instructions and data. The instructions and data may be read from a peripheral device such as a hard-disk. CPU 1410 executes the instructions using the data to provide various functions. While providing such functions, computer system 1400 uses the present invention.

Graphics controller 1410 receives pixel data in a known format (e.g., RGB, YUV) from RAM 1420 or CPU 1410 on bus 1450. In addition graphics controller 1410 receives commands from CPU 1410. The commands can specify transformation of the pixel data including upscaling operations. In the case of upscaling operations, CPU 1410 indicates the horizontal and vertical upscaling factors. These factors may in turn be specified by upscaling requests by application programs or users.

Graphics controller 1410 can include integrated circuit 1200 explained above. Thus, graphics controller 1410 receives graphics data and commands on bus 1450, upscales the source image if any upscale operations are specified in the commands, and generates display signals for display unit 1470. In response to the display signals, display unit 1470 generates display of the upscaled image on a display screen contained in display unit 1470. Display unit 1470 can be, for example, an LCD panel used in several notebooks.

Figure 15:
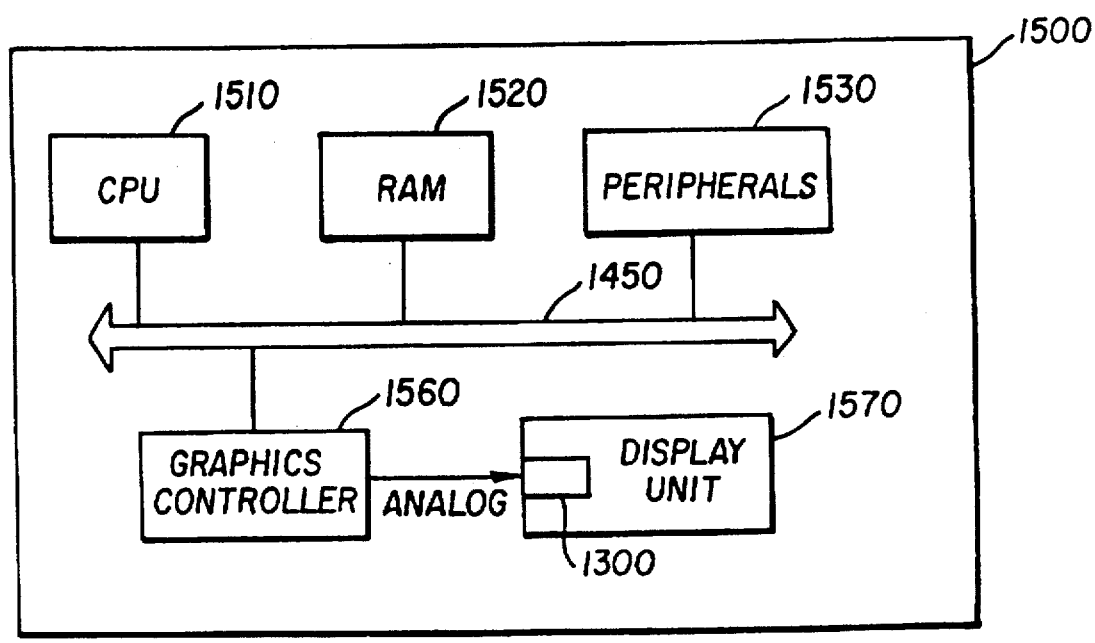
FIG. 15 is a block diagram of a system which uses a flat monitor/panel for display of an image.

In an alternative embodiment shown in FIG. 15, integrated circuit 1300 is included within display unit 1570. RAM 1570, CPU 1410, and peripherals 1530 are similar to corresponding components of FIG. 14, and are therefore not explained in the interest of conciseness. In this embodiment of computer system 1500, graphics controller 1560 can be a conventional integrated circuit which generates an image in the form of analog data.

Display unit 1570 comprises a flat monitor or a flat-panel projector (available, for example, from InFocus Company, USA). In one embodiment, display unit 1570 receives analog data and HSYNC and VSYNC signals from graphics controller 1560. Display unit 1570 includes an integrated circuit such as 1300 described above and a digital display screen (not shown). Digital display screens are characterized by display areas which are organized as several pixels, typically in horizontal lines. Display unit 1570 may be termed as a digital display device also as it includes a digital display screen.

The upscaler may provide the SCLK signal to ADC as explained already. SCLK may be generated using a digital phase-locked loop circuit as explained in the co-pending U.S. Application entitled, "A Method and Apparatus for Clock Recovery in a Digital Display Unit," referred to in the section entitled, "Related Applications" above.

Integrated circuit 1300 upscales the image to fit the display size supported in the digital display screen. If the digital display screen is particularly larger compared to the source image, upscaler of the present invention may use more than two source image scan lines to achieve a better display quality.

13. Low cost consumer Television

The upscaler described above can be used in consumer televisions also. Consumer televisions are characterized by the requirement to keep the overall costs low. On the other hand, high cost television systems may be able to justify the cost of large memory frame buffers for upscaling functions. Thus, the present invention is particularly suited for low cost television applications because the present invention does not require a frame buffer for upscaling.

Figure 16:
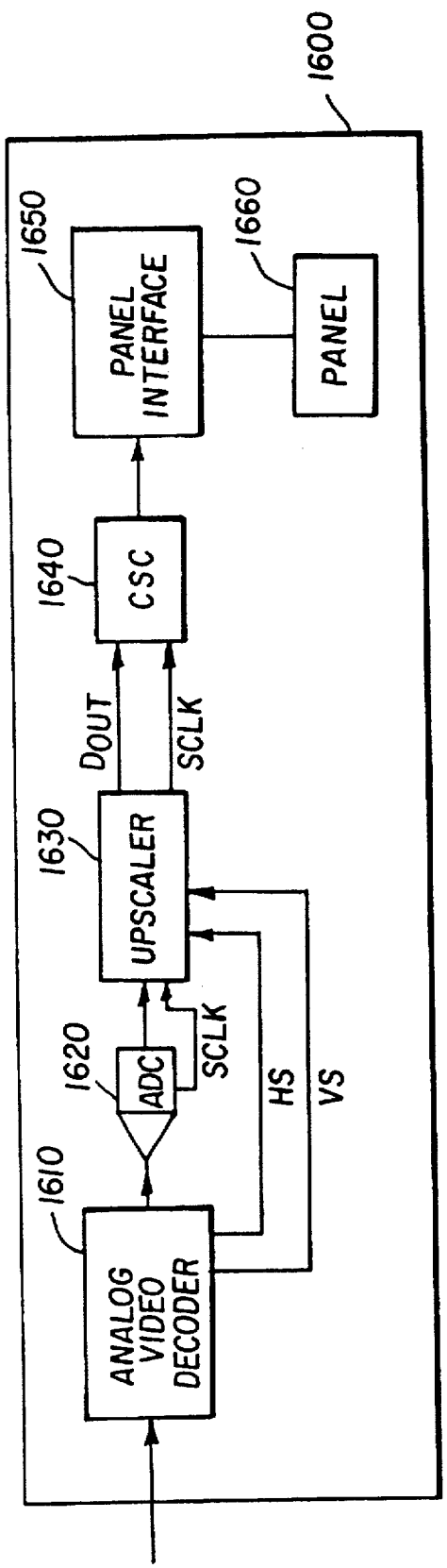
FIG. 16 is a block diagram of an embodiment of a television system employing an upscaler of the present invention.

FIG. 16 is a block diagram of an embodiment of television 1600 of the present invention. Television 1600 includes analog video decoder (AVD) 1610, ADC 1620, upscaler 1630, color space converter 1640, panel interface 1650, and a display panel 1660. AVD 1610 receives television signal on line 1601 and generates YUV signal and corresponding HSYNC and VSYNC signals in a known way.

ADC 1620 converts the analog signal into digital pixel data in a known way. The pixel data may be generated in YUV format known in the art. Upscaler 1630 provides the clock signal to ADC 1620 as explained above. The frequency of the clock signal may be controlled such that each scan line is sampled the same number of times as the number of pixel data in the destination image. Upscaler 1630 upscales the source image to fit the size of the panel 1660. Upscaling the YUV pixel data in accordance with the above description will be apparent to one skilled in the art.

The function and implementation of color space convertor (CSC) 1640 is well known in the art. CSC 1640 converts the YUV pixel data to RGB pixel data. Panel interface 1650 generates the display signals from the RGB pixel data to generate the destination image on panel 1660 in a known way.

14. Digital Video Camera

Figure 17:
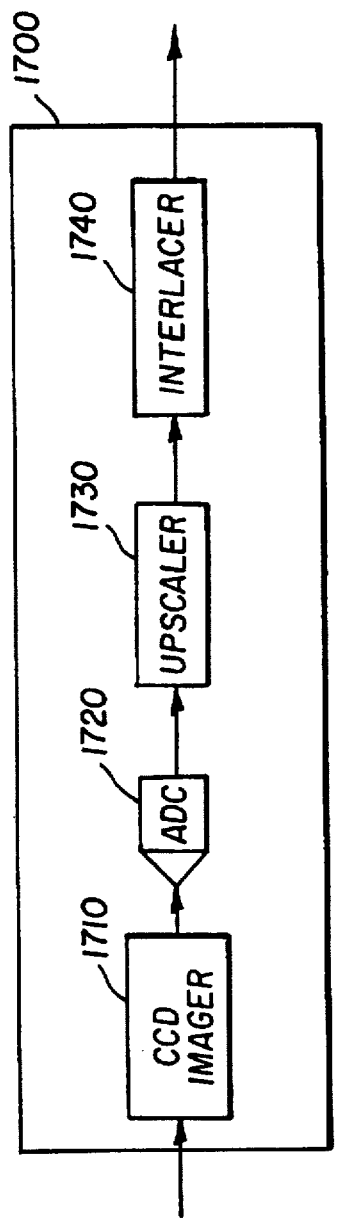
FIG. 17 is a block diagram of an embodiment of a digital video camera employing an upscaler of the present invention.

FIG. 17 is a block diagram of an embodiment of a digital video camera including charge coupled device (CCD) imager 1710, ADC 1720, upscaler 1730, and interlacer 1740. CCD imager 1710 is conventional and can be found in several analog/digital video cameras available in the market.

CCD imager 1710 typically generates images of sizes 768×494 or 510×454 or 537×550 depending on the size of the CCD. The image needs to upscaled to one of 720×485 or 640×485 or 768×575 or 720×575 depending on the video system (CCIR 601/SQP or PAL/NTSC/SECAM).

ADC 1720 converts the analog signal output of CCD imager 1710 into digital pixel data while upscaler 1730 provides the clock. Upscaler 1730 upscales the image to the required size. Interlacer 1740 generates an interlaced signal in one of several known ways to generate the display signals.

Upscaler 1730 can also be used to provide a digital zoom. That is, in stead of providing expensive lens for providing a zoom feature, upscaler 1730 can be used to provide the zoom feature to the user. Similarly, the upscaler can be used to provide special effects such as magnification of a desired portion of a source image. As the aspect ratio of the source image need not be maintained, the upscaler is particularly suited for special effects.

15. High end digital camera with CCD viewfinder

Figure 18:
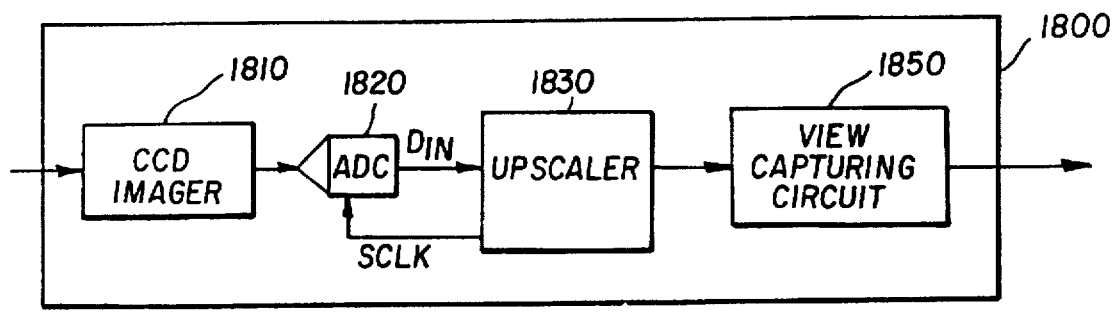
FIG. 18 is a block diagram of an embodiment of a digital camera with a CCD viewfinder.

FIG. 18 is a block diagram of an embodiment of a high end digital camera 1800 with a CCD viewfinder. In a typical usage, a user views the subject view using a viewfinder until he or she is satisfied with the view to be captured. Upon satisfaction, the user generally presses a button to capture the subject view presently being viewed using the view capturing circuit 1850. In such a situation, the upscaler can be used in the path of view capturing circuit 1850.

Thus, CCD imager 1810 provides an image typically of the size 768×494 or 510×494 or 537×550 pixels in a known manner. ADC 1820 converts the analog image data into digital pixel data and provides the input to upscaler 1830. Upscaler 1830 provides the SCLK signal to ADC 1810.

Upscaler 1830 upscales the source image (received from ADC 1820) to a desired size. The upscaled image is conveniently referred to as a destination image, even though the image here is simply being captured. Upscaler 1830 typically upscales the image to 720×485 or 640×485 or 768×575 or 720×575 depending on the medium to be recorded and the recording formats. The view capturing circuit 1850 can perform one or more of several functions such as video formatting, interlacing, and encoding to capture the subject image in a known way. The implementation of view capturing circuit 1850 depends on the medium and specific standards chosen for recording the subject image. Thus, the upscaler described above can be used in digital cameras also as explained here.

The upscaler of the present invention can also be used to provide digital zoom (as opposed to optical zoom). In this case, the source image is upscaled using the upscaler of the present invention, and the upscaled image is displayed using the digital camera. In addition, the upscaler can be used as a digital magnifier glass to provide special effects.

16. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of upscaling a source image frame in both vertical and horizontal directions to generate a destination image frame, the source image frame including a plurality of source scan lines, with each of said plurality of source scan lines including a plurality of source pixel data, the destination image frame including a plurality of destination lines, each of said plurality of destination lines including a plurality of destination pixel data, said method comprising the steps of:

(a) receiving said plurality of source pixel data included in said source image frame using a first clock signal;

(b) generating a second clock signal;

(c) upscaling said source image frame in both vertical and horizontal directions to generate said plurality of destination pixel data representative of said destination image frame; and (d) providing said plurality of destination pixel data representative of said destination image frame using said second clock signal, wherein said second clock signal is generated to have a clock period such that the time to provide said plurality of destination pixel data is equal to a period to receive said source pixel data in said source image frame.

2. The method of claim 1, wherein step (c) comprises the steps of:

(e) writing said plurality of source pixel data received in step (a) into a line buffer; and (f) reading said plurality of source pixel data written in step (e) using said second clock signal, wherein some of said source pixel data are replicated to upscale said source image.

3. The method of claim 2, further comprising the step of:

(g) interpolating the pixel data in said upscaled image to generate said destination image.

4. The method of claim 3, further comprising the step of storing the pixel data in said upscaled image in a FIFO between steps (f) and (g).

5. The method of claim 3, wherein step (g) comprises the further step of using at least a present scan line and a previous scan line for interpolation, wherein said present scan line and said previous scan line are included in said plurality of source scan lines.

6. The method of claim 5, wherein at least one of said source scan lines is used a plurality of times as a present scan line.

7. The method of claim 6, further comprising the step of providing a line qualifier signal to indicate when said at least one said source scan lines is to be used again as a present scan line.

8. The method of claim 7, further comprising the step of providing a pixel qualifier line to indicate when a pixel data provided in step (f) corresponds to a next source image pixel data.

9. The method of claim 1, wherein a source image includes one or more of said source image frames, and wherein a destination image corresponding to said source image is generated by generating a destination image frame corresponding to each of said source image frames.

10. The method of claim 2, wherein said second clock signal is locked to said first clock signal in a proportion.

11. The method of claim 10, wherein said proportion is equal to (Htotal_src×Vtotal_src)/(Htotal_dst×Vtotal_dst), wherein Htotal_src and Htotal_dst represent the total number of pixels in each source scan line and each destination line respectively, and Vtotal_src and Vtotal_dst represent the total number of lines in a source image frame and a destination image frame respectively.

12. A circuit for upscaling a source image in both vertical and horizontal directions to generate a destination image, the source image including a plurality of source scan lines, with each of said plurality of source scan lines including a plurality of source pixel data, the destination image including a plurality of destination lines, each of said plurality of destination lines including a plurality of destination pixel data, said circuit comprising:

- receiving means for receiving said plurality of source pixel data included in said source image using a first clock signal;
- clock means for providing a second clock signal; and
- upscaling means for upscaling said source image in both vertical and horizontal directions to generate an upscaled image, wherein said upscaled image includes a number of pixels equal to a number of destination pixels in said destination image, said upscaling means providing the pixel data corresponding to said upscaled image using said second clock signal,
- wherein said second clock signal has a clock period such that the time to provide the pixel data in said upscaled image is equal to a period to receive said source pixel data in said source image.

13. The circuit claim 12, wherein said upscaling means comprises:
- a line buffer;
- writing means for writing said plurality of source pixel data into said line buffer; and
- reading means for reading said plurality of source pixel data in said line buffer, wherein some of the pixel data stored in said line buffer are replicated to provide said upscaled image, and wherein the pixel data corresponding to said upscaled image is provided using said second clock signal.

14. The circuit of claim 13, wherein said line buffer comprises a dual-ported memory, and wherein said read operations are initiated in a port different from a port into which the said writing means writes said plurality of source pixel data.

15. The circuit of claim 13, wherein said line buffer comprises a single ported RAM.

16. The circuit of claim 13, wherein said line buffer includes sufficient memory to store at least two source scan lines of pixel data.

17. The circuit of claim 13, further comprising an interpolator for interpolating the pixel data in said upscaled image to generate said plurality of pixel data corresponding to said destination image.

18. An upscaler circuit for upscaling a source image in both vertical and horizontal directions to generate a destination image, the source image including a plurality of source scan lines, with each of said plurality of source scan lines including a plurality of source pixel data, the destination image including a plurality of destination lines, each of said plurality of destination lines including a plurality of destination pixel data, said circuit comprising:
- a data synchronizer for receiving said plurality of source pixel data at a source frame rate using a source clock signal;
- a clock signal generator for generating a destination clock signal;
- a line buffer for receiving and storing said plurality of source pixel data using said destination clock signal; and
- a control block for causing said plurality of source pixel data to be read from said line buffer, said control circuit causing the generation of an upscaled image which is upscaled in both vertical and horizontal directions, wherein said upscaled image includes a same number of pixel data as the number of destination image pixel data in said destination image, wherein said destination clock signal has a clock period such that the source frame rate is equal to said destination frame rate.

19. The upscaler circuit of claim 18, further comprising a pixel qualifier signal for indicating when a previous pixel data read from said line buffer is to be replicated.

20. The upscaler circuit of claim 19, further comprising an interpolator which uses at least a present scan line and a previous scan line for interpolation, wherein said present scan line and said previous scan line are included in said plurality of source scan lines, said interpolator using one of said plurality of source scan lines more than once as a present scan line.

21. The upscaler of claim 18, wherein said line buffer comprises a RAM with sufficient memory to store at least two source scan lines.

22. A system for displaying an image, comprising:
- receiving means for receiving a source image and providing a plurality of source pixel data representative of said source image;
- an upscaler coupled to said receiving means, said upscaler upscaling said source image in both vertical and horizontal directions to generate a plurality of destination pixel data representative of a destination image, said upscaler comprising:
  - a data synchronizer for receiving said plurality of source pixel data at a source frame rate using a source clock signal;
  - a clock signal generator for generating a destination clock signal;
  - a line buffer for receiving said plurality of source pixel data using said destination clock signal; and
  - a control block to cause said plurality of source pixel data to be read from said line buffer, wherein said control block causes said upscaler to generate said destination image, said destination image being generated at a destination frame rate, wherein said destination clock signal has a clock period such that said source frame rate is equal to said destination frame rate; and
- a display screen for displaying said destination image at said destination frame rate.

23. The system of claim 22, wherein said system comprises a computer system, said computer system further comprising:
- a central processing unit (CPU) for providing a command on a bus;
- a random access memory coupled to said bus;
- a graphics controller circuit for receiving a plurality of source pixel data representative of a source image.

24. The system of claim 23, wherein said upscaler is provided with said graphics controller as one integrated circuit.

25. The system of claim 23, wherein said upscaler is provided in a display unit.

26. The system of claim 25, wherein said display unit comprises a flat monitor.

27. The system of claim 22, wherein said system comprises a television system.

28. The system of claim 22, wherein said system comprises a video camera.

29. The system of claim 22, wherein said system comprises a digital camera.

30. A digital display device, comprising:
- receiving means for receiving a source image and providing a plurality of source pixel data representative of said source image;

an upscaler coupled to said receiving means, said upscaler upscaling said source image in both vertical and horizontal directions to generate a plurality of destination pixel data representative of a destination image, said upscaler comprising:
- a data synchronizer for receiving said plurality of source pixel data at a source frame rate;
- a clock signal generator for generating a destination clock signal;
- a line buffer for receiving said plurality of source pixel data using said destination clock signal; and
- a control block to cause said plurality of source pixel data to be read from said line buffer, wherein said control block causes said upscaler to generate said destination image, said destination image being generated at a destination frame rate, wherein said destination clock signal has a clock period such that said source frame rate is equal to said destination frame rate; and
- a display screen for displaying said destination image at said destination frame rate.

31. The digital display device of claim 30, wherein said source image is received as analog display data, and wherein said digital display device generates a source clock for sampling said analog display data.

32. The digital display device of claim 30, wherein said source image is received using an externally generated source clock, and wherein said destination clock is locked to said source clock.

33. The method of claim 1, wherein said source image has a first aspect ratio and said destination image frame has a second aspect ratio, and wherein said first aspect ratio is not equal to said second aspect ratio.

34. The method of claim 33, wherein the number of lines in said plurality of destination lines is not equal to the number of lines in said plurality of source scan lines.

35. The method of claim 34, wherein step (c) comprises the steps of:
  (e) writing said plurality of source pixel data received in step (a) into a line buffer; and
  (f) reading said plurality of source pixel data written in step (e) using said second clock signal, wherein some of said source pixel data are replicated to upscale said source image.

36. The method of claim 1, further comprising the steps of:
  receiving said source image in the form of an analog signal;
  generating said first clock signal; and
  sampling said analog signal using said first clock signal.

37. The method of claim 36, wherein said first clock signal is generated with a frequency such that each source scan line in said source image is sampled a number of times equal to the number of destination pixel data in each destination line.

38. The circuit of claim 13, wherein said source image has a first aspect ratio and said destination image frame has a second aspect ratio, and wherein said first aspect ratio is not equal to said second aspect ratio.

39. The circuit of claim 38, wherein the number of lines in said plurality of destination lines is not equal to the number of lines in said plurality of source scan lines.

40. The circuit of claim 13, wherein said source image is received in the form of an analog signal, and wherein said circuit further comprises:
  means for generating said first clock signal; and
  means for sampling said analog signal using said first clock signal, wherein said first clock signal is generated with a frequency such that each source scan line in said source image is sampled a number of times equal to the number of destination pixel data in each destination line.

41. The upscaler circuit of claim 18, wherein said source image has a first aspect ratio and said destination image frame has a second aspect ratio, and wherein said first aspect ratio is not equal to said second aspect ratio.

42. The upscaler circuit of claim 41, wherein the number of lines in said plurality of destination lines is not equal to the number of lines in said plurality of source scan lines.

43. The upscaler circuit of claim 18, wherein said source image is received in the form of an analog signal, and wherein said upscaler circuit further comprises a second clock generator for generating said first clock signal, wherein said first clock signal is provided to a sampling circuit for sampling said analog signal, wherein said first clock signal is generated with a frequency such that each source scan line in said source image is sampled a number of times equal to the number of destination pixel data in each destination line.

44. The system of claim 22, wherein said source image has a first aspect ratio and said destination image frame has a second aspect ratio, and wherein said first aspect ratio is not equal to said second aspect ratio.

45. The system of claim 44, wherein the number of lines in said plurality of destination lines is not equal to the number of lines in said plurality of source scan lines.

46. The system of claim 22, wherein said source image is received in the form of an analog signal, and wherein said upscaler circuit further comprises a second clock generator for generating said first clock signal, wherein said first clock signal is provided to a sampling circuit for sampling said analog signal, wherein said first clock signal is generated with a frequency such that each source scan line in said source image is sampled a number of times equal to the number of destination pixel data in each destination line.

47. The method of claim 1, wherein said method is implemented in a computer system.

48. The method of claim 47, wherein signal data for said plurality of source scan lines is received on one path and the corresponding synchronization signals are received on another path.

49. The method of claim 48, wherein step(b) comprises the further step of locking said second clock signal to said first clock signal in a proportion equal to (Htotal_src×Vtotal_src)/(Htotal_dst×Vtotal_dst), wherein Htotal_src and Htotal_dst represent the total number of pixels in each source scan line and each destination line respectively, and Vtotal_src and Vtotal_dst represent the total number of lines in a source image frame and a destination image frame respectively.

50. The method of claim 2, wherein said line buffer comprises sufficient memory to store less than or equal to two of said plurality of source scan lines.

51. The circuit of claim 12, wherein said circuit is implemented in a computer system.

52. The circuit of claim 51, wherein signal data for said plurality of source scan lines is received on one path and the corresponding synchronization signals are received on another path.

53. The circuit of claim 13, wherein said line buffer comprises sufficient memory to store less than or equal to two of said plurality of source scan lines.

54. The circuit of claim 13, wherein said second clock signal is locked to said first clock signal in a proportion.

55. The circuit of claim 54, wherein said proportion is equal to (Htotal_src×Vtotal_src)/(Htotal_dst×Vtotal_dst), wherein Htotal_src and Htotal_dst represent the total number of pixels in each source scan line and each destination line respectively, and Vtotal_src and Vtotal_dst represent the total number of lines in a source image frame and a destination image frame respectively.

56. The upscaler circuit of claim 18, wherein said upscaler circuit is implemented in a computer system.

57. The upscaler circuit of claim 56, wherein signal data for said plurality of source scan lines is received on one path and the corresponding synchronization signals are received on another path.

58. The upscaler circuit of claim 19, wherein said line buffer comprises sufficient memory to store less than or equal to two of said plurality of source scan lines.

59. The upscaler circuit of claim 19, wherein said destination clock signal is locked to said source clock signal in a proportion.

60. The upscaler circuit of claim 59, wherein said proportion is equal to (Htotal_src×Vtotal_src)/(Htotal_dst×Vtotal_dst), wherein Htotal_src and Htotal_dst represent the total number of pixels in each source scan line and each destination line respectively, and Vtotal_src and Vtotal_dst represent the total number of lines in a source image frame and a destination image frame respectively.

61. The system of claim 23, wherein said destination clock signal is locked to said source clock signal in a proportion.

62. The system of claim 61, wherein said proportion is equal to (Htotal_src×Vtotal_src) (Htotal_dst×Vtotal_dst), wherein Htotal_src and Htotal_dst represent the total number of pixels in each source scan line and each destination line respectively, and Vtotal_src and Vtotal_dst represent the total number of lines in a source image frame and a destination image frame respectively.

63. The system of claim 23, wherein signal data for said plurality of source scan lines is received on one path and the corresponding synchronization signals are received on another path.

64. The system of claim 23, wherein said line buffer comprises sufficient memory to store less than or equal to two of said plurality of source scan lines.

65. The digital display device of claim 30, wherein said digital display device is implemented in a computer system.

66. The digital display device of claim 65, wherein signal data for said plurality of source scan lines is received on one path and the corresponding synchronization signals are received on another path.

67. The digital display device of claim 65, wherein said destination clock signal is locked to said source clock signal in a proportion.

68. The digital display device of claim 67, wherein said proportion is equal to (Htotal_src×Vtotal_src)/(Htotal_dst×Vtotal_dst), wherein Htotal_src and Htotal_dst represent the total number of pixels in each source scan line and each destination line respectively, and Vtotal_src and Vtotal_dst represent the total number of lines in a source image frame and a destination image frame respectively.

69. The digital display device of claim 30, wherein said line buffer comprises sufficient memory to store less than or equal to two of said plurality of source scan lines.

70. A computer system for displaying an image, said computer system comprising:

a central processing unit (CPU) coupled to a bus;

a random access memory coupled to said bus;

receiving means coupled to said bus for receiving a source image and providing a plurality of source pixel data representative of said source image;

an upscaler coupled to said receiving means, said upscaler upscaling said source image to generate a plurality of destination pixel data representative of a destination image, said upscaler comprising:

a data synchronizer for receiving said plurality of source pixel data at a source frame rate using a source clock signal;

a clock signal generator for generating a destination clock signal;

a line buffer for receiving said plurality of source pixel data using said destination clock signal; and a control block to cause said plurality of source pixel data to be read from said line buffer, wherein said control block causes said upscaler to generate said destination image, said destination image being generated at a destination frame rate, wherein said destination clock signal has a clock period such that said source frame rate is equal to said destination frame rate; and a display screen for displaying said destination image at said destination frame rate.

71. The computer system of claim 70, wherein said upscaler is provided in a graphics controller.

72. The computer system of claim 70, wherein said upscaler is provided in a digital display unit.

73. The computer system of claim 70, said destination clock signal is locked to said source clock signal in a proportion.

74. The computer system of claim 73, wherein said proportion is equal to (Htotal_src×Vtotal_src)/(Htotal_dst×Vtotal_dst), wherein Htotal_src and Htotal_dst represent the total number of pixels in each source scan line and each destination line respectively, and Vtotal_src and Vtotal_dst represent the total number of lines in a source image frame and a destination image frame respectively.

75. The computer system of claim 70, wherein said line buffer comprises sufficient memory to store less than or equal to two of said plurality of source scan lines.

* * * * *